US011940685B2

(12) United States Patent
Hatano et al.

(10) Patent No.: US 11,940,685 B2
(45) Date of Patent: Mar. 26, 2024

(54) ANTIGLARE TRANSPARENT SUBSTRATE AND DISPLAY DEVICE PROVIDED WITH SAME

(71) Applicant: AGC Inc., Tokyo (JP)

(72) Inventors: Maya Hatano, Tokyo (JP); Satoshi Kanasugi, Tokyo (JP); Masao Ozeki, Tokyo (JP)

(73) Assignee: AGC Inc., Tokyo (JP)

( * ) Notice: Subject to any disclaimer, the term of this patent is extended or adjusted under 35 U.S.C. 154(b) by 721 days.

(21) Appl. No.: 16/950,391

(22) Filed: Nov. 17, 2020

(65) Prior Publication Data
US 2021/0080778 A1   Mar. 18, 2021

Related U.S. Application Data

(63) Continuation of application No. PCT/JP2019/019416, filed on May 15, 2019.

(30) Foreign Application Priority Data

May 21, 2018 (JP) ................................ 2018-096981

(51) Int. Cl.
*G02F 1/1335* (2006.01)
*C03C 15/00* (2006.01)
(Continued)

(52) U.S. Cl.
CPC ........ *G02F 1/133502* (2013.01); *C03C 15/00* (2013.01); *C03C 21/002* (2013.01); *G02F 1/133331* (2021.01)

(58) Field of Classification Search
CPC ... G02B 1/00; G02B 1/10; G02B 1/11; G02B 1/12; G02B 1/14; G02B 27/0018;
(Continued)

(56) References Cited

U.S. PATENT DOCUMENTS

2012/0308794 A1   12/2012   Lai et al.
2017/0174562 A1   6/2017   Torii et al.
(Continued)

FOREIGN PATENT DOCUMENTS

CN   102416737 A   4/2012
CN   105693101 A   6/2016
(Continued)

OTHER PUBLICATIONS

International Search Report dated Aug. 20, 2019 in PCT/JP2019/019416 filed May, 15, 2019, 2 pages.
(Continued)

*Primary Examiner* — Arnel C Lavarias
(74) *Attorney, Agent, or Firm* — Oblon, McClelland, Maier & Neustadt, L.L.P.

(57) ABSTRACT

An antiglare transparent substrate includes a transparent substrate which includes a chemically strengthened glass and has a first main surface and a second main surface. The first main surface includes: a first smooth region having an arithmetic average roughness Ra of 0.05 nm or more and 2 nm or less; and a first rough region having an arithmetic average roughness Ra larger than the arithmetic average roughness Ra of the first smooth region. The second main surface includes, in at least a part of a region facing the first smooth region, a second smooth region having an arithmetic average roughness Ra of 0.05 nm or more and 2 nm or less.

15 Claims, 9 Drawing Sheets

(51) Int. Cl.
*C03C 21/00* (2006.01)
*G02F 1/1333* (2006.01)

(58) Field of Classification Search
CPC ......... G02F 1/133502; G02F 1/133331; C03C 15/00; C03C 21/002; C03C 15/02; C03C 15/025; C03C 19/00; C03C 21/001
USPC ...... 359/601, 599, 602, 603, 609; 65/90, 92, 65/93, 94, 30.1, 30.13, 385, 400
See application file for complete search history.

(56) References Cited

U.S. PATENT DOCUMENTS

| | | | |
|---|---|---|---|
| 2017/0313622 A1* | 11/2017 | Ogami | ............... C03C 21/005 |
| 2018/0072607 A1 | 3/2018 | Fujii et al. | |
| 2018/0088399 A1 | 3/2018 | Fukushi et al. | |
| 2018/0257978 A1* | 9/2018 | Minamidate | ............ B32B 27/14 |
| 2018/0273421 A1 | 9/2018 | Inamoto et al. | |
| 2018/0273425 A1* | 9/2018 | Mishiro | ................. C09D 5/006 |
| 2019/0002331 A1* | 1/2019 | Lezzi | ..................... C03C 23/007 |
| 2020/0199020 A1* | 6/2020 | Hatano | ................. G06F 1/1626 |

FOREIGN PATENT DOCUMENTS

| | | | | |
|---|---|---|---|---|
| CN | 107814478 A | | 3/2018 | |
| CN | 107867792 A | | 4/2018 | |
| JP | 2013228669 A | * | 11/2013 | ............. C03B 11/08 |
| JP | 2017-116573 A | | 6/2017 | |
| WO | WO 2014/189775 A1 | | 11/2014 | |
| WO | WO 2017/082199 A1 | | 5/2017 | |
| WO | WO 2017/094683 A1 | | 6/2017 | |

OTHER PUBLICATIONS

Extended European Search Report dated Feb. 18, 2022 in European Patent Application No. 19807870.1, 8 pages.

* cited by examiner

ANTIGLARE TRANSPARENT SUBSTRATE AND DISPLAY DEVICE PROVIDED WITH SAME

TECHNICAL FIELD

The present invention relates to an antiglare transparent substrate and a display device including the same.

BACKGROUND ART

In-vehicle information equipment such as car navigation system or audio, etc. and portable communication equipment are equipped with a display device.

In the display device, a protective cover that is a plate-like transparent substrate is provided on a front surface of a display panel via an adhesive layer. The protective cover has a function of reducing reflection of external light or protecting the display panel from external impact.

For the protective cover, a chemically strengthened glass is sometimes used in view of strength, appearance and visibility. On the other hand, disturbing reflection of the surrounding scene is sometimes caused in the protective cover by incident light.

In order to prevent disturbing reflection by incident light, it is effective to apply an antiglare treatment (AG treatment) to the surface of the protective cover and fabricate an antiglare transparent substrate. The antiglare treatment is a treatment of forming fine irregularities on the surface of the protective cover. Thanks to the surface subjected to antiglare treatment, incident light can be scattered to blur the annoyingly reflected surrounding scene.

The antiglare treatment is useful from the viewpoint of preventing reflection, but in some cases, it is undesired to provide fine irregularities in a region where a smooth surface is required. Because, in the case where the display device has a function of reading a three-dimensional shape of an authentication target as in the fingerprint authentication, the authentication section may mistake fine irregularities formed by antiglare treatment for a part of the three-dimensional shape of the authentication target.

Then, a method of removing fine irregularities by polishing a part of the surface after antiglare treatment by means of a grindstone has been proposed (Patent Literature 1).

CITATION LIST

Patent Literature

Patent Literature 1: JP-A-2017-116573

SUMMARY OF INVENTION

Technical Problem

However, when both a region where antiglare treatment is applied to a chemically strengthened glass and a region where the treatment is not applied are provided, there is a problem that the glass substrate is likely to be warped.

This occurs because when chemical strengthening is performed after antiglare treatment, due to the difference in the surface profile, the mass transfer coefficient of ions exchanged by chemical strengthening is changed between the region subjected to antiglare treatment and the region not subjected to antiglare treatment, and in turn, the chemical strengthening becomes non-uniform, resulting in an uneven stress distribution among major surfaces.

In addition, warpage is likely to occur because even if the antiglare treatment is performed after chemical strengthening, at the time of heat treatment after the antiglare treatment, due to the difference in the surface profile, the mass transfer coefficient of the component in the glass is changed between the surface subjected to antiglare treatment and the surface not subjected to antiglare treatment, and the stress distribution among major surfaces becomes uneven.

The present invention has been invented in consideration of these problems, and an object thereof is to provide an antiglare transparent substrate capable of reducing warpage even when both a region subjected to antiglare treatment and a region not subjected to antiglare treatment are provided on a transparent substrate.

Solution To Problem

The antiglare transparent substrate of the present invention includes a transparent substrate which includes a chemically strengthened glass and has a first main surface and a second main surface, wherein the first main surface includes a first smooth region having an arithmetic average roughness Ra of 0.05 nm or more and 2 nm or less and a first rough region having an arithmetic average roughness Ra larger than the arithmetic average roughness Ra of the first smooth region and the second main surface includes, in at least a part of a region facing the first smooth region, a second smooth region having an arithmetic average roughness Ra of 0.05 nm or more and 2 nm or less.

According to the present invention, irrespective of the position of the first rough region, the first smooth region faces at least a part of the second smooth region. Therefore, in the regions facing each other, a difference in the stress distribution due to the difference in the surface profile between major surfaces is hardly caused. Consequently, even in the case of providing both a region subjected to antiglare treatment and a region not subjected to antiglare treatment on a transparent substrate, warpage can be reduced.

In the present invention, the arithmetic average roughness Ra of the first rough region is preferably more than 2 nm and 1,000 nm or less.

In the case where the arithmetic average roughness Ra of the first rough region is more than 2 nm and 1,000 nm or less, the disturbing reflection can be blurred by causing scattering of visible light incident on the first rough region from the first main surface side. Accordingly, the first rough region can be favorably used as a surface subjected to antiglare treatment.

In the present invention, the second main surface preferably further includes a second rough region having an arithmetic average roughness Ra larger than the arithmetic average roughness Ra of the second smooth region.

In the case of having a rough region also in the second main surface, the antiglare property can be exhibited also for visible light incident from the second main surface side.

In the present invention, the arithmetic average roughness Ra of the second rough region is preferably more than 2 nm and 1,000 nm or less.

In the case where the surface roughness of the second rough region is more than 2 nm and 1,000 nm or less in terms of the arithmetic average roughness Ra, the disturbing reflection can be blurred by causing scattering of visible light incident on the second rough region from the second main surface side. Accordingly, the second rough region can be favorably used as a surface subjected to antiglare treatment.

In the present invention, denoting Z as an atomic composition ratio X/Si of an element X selected from the group consisting of Al, B, Zr, and Ti to Si, $Z_1$ as the atomic composition ratio Z in the first rough region, and $Z_0$ as the atomic composition ratio Z in the first smooth region, a ratio $Z_1/Z_0$ of $Z_1$ to $Z_0$ is preferably from 0 to 1.1.

When the ratio $Z_1/Z_0$ is from 0 to 1.1, even if an antireflection layer, etc. is stacked on the surface, the layer is less likely to act as an optically heterogeneous layer, and an excellent antiglare transparent substrate is obtained.

In the present invention, a skewness (Ssk) of a surface of the first rough region may be 0 or more.

When Ssk is 0 or more, the peak width of a projection of the first rough region is narrowed, and an effect of enhancing the finger slipperiness or making a fingerprint be less marked can be expected.

In the present invention, the skewness (Ssk) of the surface of the first rough region may be 0.2 or more.

When Ssk is 0.2 or more, light scattering on the glass surface increases, and this is effective in reducing the sparkle of the glass surface.

In the present invention, a skewness (Ssk) of a surface of the first rough region may be less than 0.

When Ssk is less than 0, the peak width of a recess of the first rough region is narrowed, and abrasion resistance can be enhanced.

In the present invention, the skewness (Ssk) of the surface of the first rough region may be less than −0.2.

When Ssk is less than −0.2, this is effective in eliminating gloss or luster of the glass surface layer, and the antiglare effect increases.

In the present invention, assuming a tensile stress to be a positive value and a compressive stress to be a negative value, a plate-thickness-direction stress integrated value S of the first smooth region is preferably less than 0 MPa.

When the plate-thickness-direction stress integrated value S is less than 0 MPa, a compressive stress is generated in the plate thickness direction of the transparent substrate including the first smooth region.

Consequently, the transparent substrate is resistant to breakage by impact on the first smooth region.

In the present invention, the plate-thickness-direction stress integrated value S of the first smooth region is preferably less than −3 MPa.

When the plate-thickness-direction stress integrated value S is less than −3 MPa, a higher compressive stress is generated in the plate thickness direction of the transparent substrate including the first smooth region.

Consequently, the transparent substrate is further resistant to breakage by impact on the first smooth region.

In the present invention, a surface compressive stress CS of the first smooth region is preferably larger than a surface compressive stress CS of the first rough region.

In the case where the surface compressive stress CS of the first smooth region is larger than the surface compressive stress CS of the first rough region, when an impact is applied to the antiglare transparent substrate, the first smooth region is more resistant to breakage than the first rough region. Accordingly, in the case of using the first smooth region for fingerprint authentication, etc., non-authenticability due to external impact is less likely to occur.

In the present invention, in the case where the surface compressive stress CS of the first smooth region is larger than the surface compressive stress CS of the first rough region, the surface compressive stress CS of the first rough region is preferably 500 MPa or more.

In the case where the surface compressive stress CS of the first smooth region and first rough region is 500 MPa or more, when an impact is applied to the antiglare transparent substrate, the transparent substrate is further resistant to breakage.

In the present invention, the transparent substrate has a thickness of preferably 2 mm or less.

When the thickness of the transparent substrate is 2 mm or less, the mass of the antiglare transparent substrate can be decreased to achieve weight reduction, and furthermore, when a fingerprint authentication section, etc. is provided between the antiglare transparent substrate and the display panel, the authentication accuracy can be enhanced.

In the present invention, at least a part of the first rough region preferably has a bent portion.

In the case where at least a part of the first rough region preferably has a bent portion, even when the partner-side member on which the antiglare transparent substrate is mounted has a bent shape, reduction in the mounting accuracy can be prevented.

The display device of the present invention includes the antiglare transparent substrate according to any one of those described above.

According to the present invention, a display device protected by the antiglare transparent substrate is obtained.

DESCRIPTION OF EMBODIMENTS

One embodiment of the present invention is described below, but the present invention is not limited to the following embodiment. In addition, various modifications and substitutions, etc. can be added to the following embodiment without departing from the scope of the present invention.
(Configuration of Antiglare Transparent Substrate)

Figure 1:
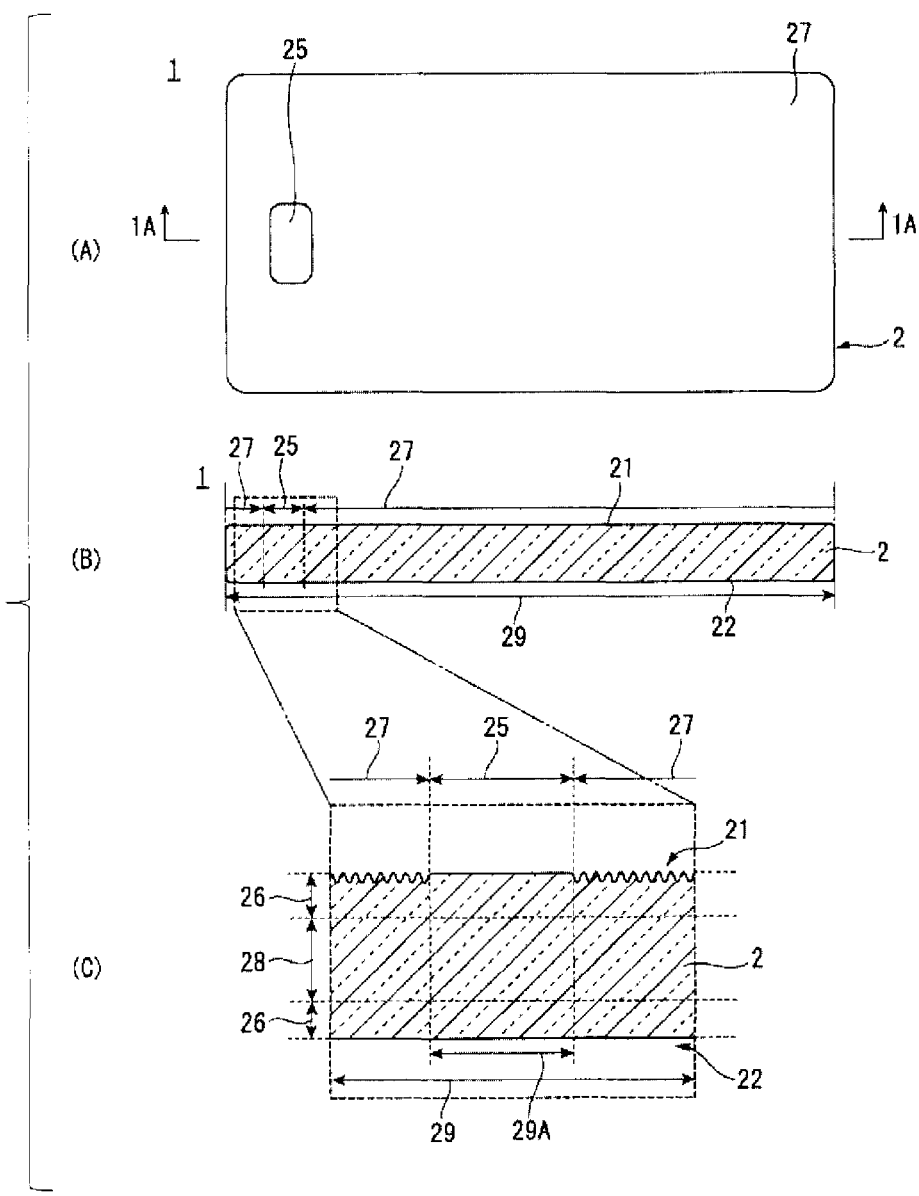
FIG. 1 is a diagram illustrating the antiglare transparent substrate according to this embodiment: (A) is a plan view, (B) is a 1A-1A cross-sectional diagram of (A), and (C) is an enlarged diagram of the region surrounded by the dotted line in (B).

First, the structure of the antiglare transparent substrate is described by referring to FIG. 1.

The antiglare transparent substrate according to this embodiment includes a transparent substrate composed of a chemically strengthened glass and is used for protecting any protection target.

As illustrated in FIG. 1, the antiglare transparent substrate 1 includes a transparent substrate 2 composed of a plate-like chemically strengthened glass.

The transparent substrate 2 has a first main surface 21 and a second main surface 22. The first main surface 21 includes a first smooth region 25 and a first rough region 27. The second main surface 22 includes a second smooth region 29.

The transparent substrate 2 is a chemically strengthened glass and therefore, includes a compressive stress layer 26 and a tensile stress layer 28. The compressive stress layer 26 is a layer on which a compressive stress acts (a layer having a compressive stress of 0 MPa or more). The compressive stress layer 26 is provided over a range from the surface of each of the first main plane 21 and the second main plane 22 to a predetermined depth in the plate thickness direction. The compressive stress layer 26 is provided also on the end face, but the description thereof is omitted here.

The tensile stress layer 28 is a layer on which a tensile stress acts (a layer having a compressive stress of less than 0 MPa). The tensile stress layer 28 is provided between compressive stress layers 26.

The first smooth region 25 is a region including a smooth surface. In the case where the object to be protected by the antiglare transparent substrate 1 is a smartphone, the first smooth region 25 is provided at a position facing a sensor such as fingerprint authentication sensor.

In the first smooth region 25, the surface roughness is 0.05 nm or more and 2 nm or less in terms of the arithmetic average roughness Ra.

When Ra is 2 nm or less, a smooth surface is obtained, and the detection accuracy of the sensor is enhanced. When Ra is 0.05 nm or more, the cost involved in surface finishing can be reduced.

The arithmetic average roughness Ra is a value specified in JIS B 0601 (2013).

Ra is preferably 0.06 nm or more and 1.8 nm or less, more preferably 0.07 nm or more and 1.5 nm or less, still more preferably 0.08 nm or more and 1.2 nm or less.

The second smooth region 29 is a region including a smooth surface. The second smooth region 29 has at least partially a region 29A facing the first smooth region 25. The "facing" as used herein means that the positions on a plane of the first smooth region 25 and the region 29A, i.e. here the positions when viewed from the first main surface 21 or the second main surface 22, are overlapped.

The surface roughness of the second smooth region 29 is on the same level as the first smooth region 25 and is 0.05 nm or more and 2.0 nm or less in terms of the arithmetic surface roughness Ra.

The first rough region 27 is a region in which the surface roughness is, in terms of the arithmetic average roughness, larger than that of the first smooth region 25. In the case where the object to be protected by the antiglare transparent substrate 1 is a smartphone, the first rough region 27 corresponds to the antiglare-treated region facing the display area.

In the first rough region 27, the surface roughness is preferably more than 2 nm and 1,000 nm or less in terms of the arithmetic average roughness Ra.

When the arithmetic average roughness Ra is more than 2.0 nm, the light incident on the antiglare transparent substrate 1 from the first main surface 21 side can be scattered to blur disturbing reflection by incident light.

When the arithmetic average roughness Ra is 1,000 nm or less, the visibility of the display area covered by the first rough region 27 can be ensured.

In the first rough region 27, the surface roughness is, in terms of the arithmetic average roughness Ra, preferably more than 2 nm and 1,000 nm or less, more preferably 5 nm or more and 200 nm or less, still more preferably 50 nm or more and 75 nm or less. When the arithmetic average roughness Ra is in the range above, the haze value of the first rough region 27 can be adjusted to be 1% or more and 30% or less. The haze value is a value specified in JIS K 7136 (2000).

As long as the arithmetic average roughness satisfies the range above, the surface profile of the first rough region 27 is not particularly limited. The surface profile may be a profile in which fine particles are sprayed on a glass surface by an electrostatic spray, etc. to form projections, or may be a profile in which recesses are formed on a glass surface by etching.

Denoting $S_1$ as the area of the first smooth region 25 and $S_2$ as the area of the first rough region 27, the area ratio $S_1/S_2 \times 100$ is not particularly limited but is approximately 0.5% or more and 10% or less. The area ratio ($S_1/S_3 \times 100$) of the area $S_1$ of the first smooth region 25 to the area $S_3$ of the second smooth region 29 is also not particularly limited but is approximately 90% or more and 99.5% or less.

In the case where the surface profile is a profile formed by forming projections or recesses, when the atomic composition ratio X/Si of an element X selected from the group consisting of Al, B, Zr, and Ti to Si is defined as Z, the atomic composition ratio Z in the first rough region is defined as $Z_1$, and the atomic composition ratio Z in the first smooth region is defined as $Z_0$, the ratio $Z_1/Z_0$ of $Z_1$ to $Z_0$ is preferably from 0 to 1.1. In the case where the amount of Si contained in the first rough region 27 is large as in spray coating, $Z_1/Z_0$ is preferably less than 1. On the other hand, in the case where the amount of Si contained in the first rough region 27 is small, $Z_1/Z_0$ is preferably from 1 to 1.1.

The contents of Si and the element X can be measured by a known technique such as EDX (Energy Dispersive X-ray spectrometry) and ICP (Inductively Coupled Plasma), etc.

The Si content in the first rough region 27 or the first smooth region 25 corresponds to the Si content in a range from the surface of the first main surface 21 to a depth of about 1 μm in the plate thickness direction or to a depth of about 0.1% relative to the overall thickness of the transparent substrate 2.

In the case where the surface profile is a profile formed by forming projections, the skewness (Ssk) of the surface of the first rough region 27 is preferably 0 or more. When Ssk is 0 or more, the peak width of a projection is narrowed, and an effect of enhancing the finger slipperiness or making the fingerprint be less marked can be expected. The skewness (Ssk) of the surface of the first rough region 27 is more preferably 0.2 or more.

The skewness (Ssk) of the surface is a value specified in ISO 25178-2 (2012).

In the case where the surface profile is a profile formed by forming recesses, the skewness (Ssk) of the surface of the first rough region 27 is preferably less than 0. When Ssk is less than 0, the peak width of a recess is narrowed, and the abrasion resistance can be enhanced. The skewness (Ssk) of the surface of the first rough region 27 is more preferably less than −0.2.

In the antiglare transparent substrate 1, assuming the tensile stress to be a positive value and the compressive stress to be a negative value, the plate-thickness-direction stress integrated value S of the first smooth region 25 is preferably less than 0 MPa.

When the plate-thickness-direction stress integrated value S of the first smooth region 25 is less than 0 MPa, a compressive stress is generated in the plate thickness direction including the first smooth region 25. Consequently, even when the plate thickness of a region including the first smooth region 25 is thin, the transparent substrate is resistant to breakage by impact and has the required strength.

The plate-thickness-direction stress integrated value S as used herein is a value obtained by determining the retardation R by means of a retardation evaluation device such as WPA100 of Photonic Lattice, Inc. and converting it to the S value according to the following formula (1):

$$S = \text{retardation } R \div \text{photoelastic constant } C \text{ of glass} \quad (1)$$

The measurement position is not particularly limited as long as it is within the first smooth region 25, but the position is, for example, the position of the center of gravity. Denoting σ as the internal stress (strictly, the difference between main stresses) and t as the plate thickness, the relationship of retardation R and photoelastic constant C in formula (1) is represented by R/C=σt, and therefore, the plate-thickness-direction stress integrated value S of formula (1) corresponds to σt that is equivalent to the internal stress integrated value.

The plate-thickness-direction stress integrated value S is preferably less than −3 MPa because of generation of a higher compressive stress and is more preferably less than −5 MPa. Within this range, a crack, etc. generated on the main surface of the antiglare transparent substrate 1 is less likely to develop, and the impact resistance of the antiglare transparent substrate 1 increases. The lower limit value of the plate-thickness-direction stress integrated value S is not particularly limited but is preferably −20 MPa or more, more preferably −10 MPa or more. Within this range, the retardation representing optical strain of the antiglare transparent substrate 1 decreases, and the light transmitting through the antiglare transparent substrate 1 is hardly polarized, so that in the case of using an optical sensor, etc., the authentication accuracy can be enhanced.

The specific method for adjusting the plate-thickness-direction stress integrated value S to be less than 0 MPa includes a method of applying a chemical strengthening after reducing the plate thickness in a region including the first smooth region 25 as much as possible. The chemical strengthening time is preferably longer. There is also a method of selectively applying a chemical strengthening to the first smooth region 25.

In the antiglare transparent substrate 1, the surface compressive stress CS of the first smooth region 25 is preferably larger than the surface compressive stress CS of the first rough region 27. In this case, when an impact is applied to the antiglare transparent substrate 1, the first smooth region 25 is resistant to breakage. Accordingly, in the case of using the first smooth region 25 for fingerprint authentication, etc., non-authenticability due to external impact is advantageously less apt to occur.

In the case where the surface compressive stress CS of the first smooth region is larger than the surface compressive stress CS of the first rough region, the surface compressive stress CS of the first rough region 27 is preferably 500 MPa or more, more preferably 600 MPa or more. When the surface compressive stress CS of each of the first smooth region 25 and the first rough region 27 is 500 MPa or more, the antiglare transparent substrate 1 is further resistant to impact and further resistant to breakage. The upper limit value of the surface compressive stress CS is not particularly limited but is preferably 900 MPa or less, more preferably 800 MPa or less. Within this range, the antiglare transparent substrate 1 is not broken down into too small fragments when broken, and even if the antiglare transparent substrate 1 is broken, the authentication function may be maintained.

The surface compressive stress CS can be measured using a surface stress meter (for example, FSM-6000 manufactured by Orihara Industrial Co., Ltd.), etc.

The depth of compressive stress DOL of the first smooth region 25 is preferably 10 μm or more, preferably 20 μm or more, more preferably 30 μm or more, still more preferably 50 μm or more. When DOL is 10 μm or more, the abrasion resistance of the antiglare transparent substrate 1 can be enhanced. The depth of compressive stress DOL is preferably 150 μm or less, more preferably 100 μm or less. Within this range, the process time can be shortened, and strengthening can be advantageously achieved with more realistic cost.

The depth of compressive stress layer DOL can be measured by any method. For example, an alkali ion concentration analysis (in the case of this example, potassium ion concentration analysis) in the depth direction of glass is performed using an EPMA (Electron Probe Micro Analyzer), and the ion diffusion depth obtained by measurement can be regarded as the depth of compressive stress layer DOL.

The depth of compressive stress layer DOL can also be measured using a surface stress meter (for example, FSM-6000 manufactured by Orihara Industrial Co., Ltd.), etc. In the case of ion-exchanging lithium ions in a glass surface layer with sodium ions in a molten salt, a sodium ion concentration analysis in the depth direction of glass is performed using EPMA, and the ion diffusion depth obtained by measurement can be regarded as the depth of compressive stress layer DOL.

The internal tensile stress CT of the first smooth region 25 is preferably from 10 MPa to 100 MPa. When CT is 10 MPa or more, a crack can be inhibited from developing to the first smooth region 25. When CT is 100 MPa or less, even if the glass is broken, finely broken glass pieces can be prevented from shattering.

In general, the internal tensile stress CT is approximately determined according to the relational expression CT=(CS×DOL)/(t−2×DOL) by using the plate thickness t and the surface compressive stress CS and depth of compressive stress layer DOL of the compressive stress layer 26.

In the forgoing pages, the configuration of the antiglare transparent substrate 1 is described.

[Production Method]

Next, an example of the production method is described.

First, a chemically strengthened glass is produced.

The chemically strengthened glass is produced by subjecting a glass for chemical strengthening produced by a general glass production method to a chemical strengthening treatment.

The chemical strengthening treatment is a treatment of applying an ion-exchange treatment to a glass surface to form a surface layer having a compressive stress. Specifically, metal ions (typically, Li ions and Na ions) having a small ionic radius present near the glass plate surface are substituted by ions (typically, Na ions or K ions for Li ions, and K ions for Na ions) having a larger ionic radius by conducting an ion-exchange treatment at a temperature not more than the glass transition temperature of a glass for chemical strengthening.

The chemically strengthened glass can be produced by subjecting a glass for chemical strengthening to a chemical strengthening treatment. The below-described production method is an example when producing a plate-like chemically strengthened glass.

First, raw materials of glass are mixed, and the mixture is melted by heating in a glass melting kiln. Thereafter, the glass is homogenized, for example, by bubbling, stirring, or addition of a refining agent, formed into a glass plate having a predetermined thickness by a conventionally known forming method, and slowly cooled. Alternatively, the glass may be formed in a plate shape by a method in which the glass is formed into a block shape, slowly cooled and then cut.

The method for forming in a plate shape includes, for example, a float process, a pressing method, a fusion process, and a down-draw method. Among others, in the case of producing a large size glass plate, a float process is preferred. In addition, a continuous forming method other than the float process, for example, a fusion process or a down-draw method, is also preferred.

Thereafter, the formed glass is cut into a predetermined size and chamfered. The chamfering is preferably performed such that the plan-view dimension of the chamfered portion is 0.05 mm or more and 0.5 mm or less.

Next, chemical strengthening is performed by subjecting the glass plate to one time or twice (1-step or 2-step) ion-exchange treatments to form a compressive stress layer 26 and a tensile stress layer 28.

In the chemical strengthening step, the glass used for treatment is put into contact with a molten salt (for example, potassium salt or sodium salt) containing alkali metal ions having an ionic radius larger than that of alkali metal ions (for example, sodium ions or lithium ions) contained in the glass in a temperature range not exceeding the transition temperature of the glass.

Alkali metal ions in the glass are ion-exchanged with alkali metal ions having a large ionic radius of the alkali metal salt, and a compressive stress is generated on the glass surface due to a difference in the occupied area of alkali metal ions to form a compressive stress layer 26. The temperature range in which the glass is put into contact with the molten salt may be sufficient if it is a temperature range not exceeding the transition temperature of the glass, but the temperature is preferably lower than the glass transition temperature by 50° C. or moree. In this case, stress relaxation of the glass can be prevented.

In the chemical strengthening treatment, the treatment temperature and treatment time for which the glass is put into contact with a molten salt containing alkali metal ions may be appropriately adjusted according to the compositions of the glass and molten salt. The heating temperature of the molten salt is usually, preferably 350° C. or more, more preferably 370° C. or more, and is usually, preferably 500° C. or less, more preferably 450° C. or less.

When the heating temperature of the molten salt is 350° C. or more, chemical strengthening is prevented from becoming difficult due to a decrease in the ion-exchange rate. In addition, when the heating temperature is 500° C. or less, decomposition and degradation of the molten salt can be suppressed.

The treatment time for which the glass is put into contact with the molten salt is usually, preferably 10 minutes or more, more preferably 15 minutes or more, per one treatment so as to impart a sufficient compressive stress. With the ion-exchange for a long period of time, productivity drops and the compressive stress value is reduced by relaxation. Accordingly, the treatment time is usually, preferably 20 hours or less, more preferably 16 hours or less, per one treatment.

As for the number of chemical strengthening treatments, one treatment or two treatments is exemplified, but as long as intended physical properties (DOL, CS, CT) of the compressive stress layer 26 and tensile stress layer 28 are obtained, the number of treatments is not particularly limited. The number of chemical strengthening treatments may be three or more. In addition, a heat treatment step may be performed between two strengthening treatments. In the following description, in the case of performing three chemical strengthening treatments and in the case of performing a heat treatment step between two strengthening treatments, these are referred to as 3-step strengthening.

In the case of 3-step strengthening, for example, the chemical strengthened glass can be produced, for example, using the below-described strengthening treatment method 1 or strengthening treatment method 2.

(Strengthening Treatment Method 1)

In the strengthening treatment method 1, first, a $Li_2O$-containing glass for chemical strengthening is put into contact with a metal salt (first metal salt) containing sodium (Na) ions to cause ion-exchange between Na ions in the metal salt and Li ions in the glass.

Hereinafter, this ion-exchange treatment is sometimes referred to as "first-step treatment". In the first-step treatment, for example, a glass for chemical strengthening is immersed in a Na ion-containing metal salt (for example, sodium nitrate) at approximately from 350 to 500° C. for approximately from 0.1 to 24 hours. In order to increase the productivity, the first-step treatment time is preferably 12 hours or less, more preferably 6 hours or less.

A deep compressive stress layer 26 can be formed on the glass surface by the first-step treatment, and a stress profile having CS of 200 MPa or more and a depth of compressive stress DOL of 1/8 or more of the plate thickness can be formed. Furthermore, in the glass at the stage after the completion of the first-step treatment, the internal tensile stress CT is large and therefore, the frangibility is high. However, since the frangibility is improved by a later treatment, it is rather advantageous to have large CT at this stage. The internal tensile stress CT of the glass after the completion of the first-step treatment is preferably 90 MPa or more, more preferably 100 MPa or more, still more preferably 110 MPa or more, because the surface compressive stress CS of the compressive stress layer 26 increases.

The first metal salt is an alkali metal salt and contains, as the alkali metal ion, Na ions in a largest amount. The metal salt may contain Li ions, but the content of Li ions is preferably 2% or less, more preferably 1% or less, still more preferably 0.2% or less, relative to the number of moles of 100% of alkali ions. In addition, the metal salt may contain K ions. The content of K ions is preferably 20% or less, more preferably 5% or less, relative to the number of moles of 100% of alkali metal ions contained in the first metal salt.

Next, the glass after the completion of the first-step treatment is put into contact with a lithium (Li) ion-containing metal salt (second metal salt), and the compressive stress value near the surface layer is reduced by ion-exchange of Li ions in the metal salt with Na ions in the glass. This treatment is sometimes referred to as "second-step treatment".

Specifically, for example, the glass is immersed in a metal salt containing Na and Li (for example, a mixed salt of sodium nitrate and lithium nitrate) at approximately from 350 to 500° C. for approximately from 0.1 to 24 hours. In order to increase the productivity, the second-step treatment time is preferably 12 hours or less, more preferably 6 hours or less.

In the glass after the completion of the second-step treatment, the internal tensile stress can be reduced and when the glass is broken, violent breakage does not occur.

The second metal salt is an alkali metal salt and preferably contains, as the alkali metal ion, Na ions and Li ions. Furthermore, a nitrate salt is preferred. Relative to the number of moles of 100% alkali metal ions contained in the second metal salt, the total number of moles of Na ions and Li ions is preferably 50% or more, more preferably 70% or more, still more preferably 80% or more. The stress profile at a depth of 1/4 to 1/2 of DOL can be controlled by adjusting the Na/Li molar ratio.

The optimal value of the Na/Li molar ratio of the second metal salt varies depending on the glass composition but is preferably 0.3 or more, more preferably 0.5 or more, still more preferably 1 or more. In order to increase the compressive stress value of the compressive stress layer 26 while reducing CT, the Na/Li molar ratio in the second metal salt is preferably 100 or less, more preferably 60 or less, still more preferably 40 or less.

In the case where the second metal salt is a sodium nitrate-lithium nitrate mixed salt, the mass ratio of sodium nitrate to lithium nitrate is, for example, preferably from 25:75 to 99:1, more preferably from 50:50 to 98:2, still more preferably from 70:30 to 97:3.

Next, the glass after the completion of the second-step treatment is put into contact with a potassium (K) ion-containing metal salt (third metal salt), and a large compressive stress is generated in the glass surface by ion-exchange of K ions in the metal salt with Na ions in the glass. This ion-exchange treatment is sometimes referred to as "third-step treatment"

Specifically, for example, the glass is immersed in a K ion-containing metal salt (for example, potassium nitrate) at approximately from 350 to 500° C. for approximately from 0.1 to 10 hours. Through this process, a large compressive stress can be formed in a region of approximately from 0 to 10 μm of the glass surface layer.

The third-step treatment increases only the compressive stress in a shallow portion of the glass surface and scarcely affects the inside, so that a large compressive stress can be formed in the surface layer while suppressing the internal tensile stress.

The third metal salt is an alkali metal salt and may contain Li ions as the alkali metal ion, but the content of Li ions is preferably 2% or less, more preferably 1% or less, still more preferably 0.2% or less, relative to the number of moles of 100% of alkali metal ions. In addition, the content of Na ions is preferably 2% or less, more preferably 1% or less, still more preferably 0.2% or less.

In the strengthening treatment method 1, the sum total of the first-step to third-step treatment times can be 24 hours or less and therefore, the productivity is advantageously high. The sum total of treatment times is more preferably 15 hours or less, still more preferably 10 hours or less.

(Strengthening Treatment Method 2)

In the strengthening treatment method 2, first, a first-step treatment in which a Li$_2$O-containing glass for chemical strengthening is put into contact with a first metal salt containing sodium (Na) ions to cause ion-exchange between Na ions in the metal salt and Li ions in the glass is performed.

The first-step treatment is the same as that in the strengthening treatment method 1, and description thereof is omitted.

Next, the glass after the completion of the first-step treatment is heat-treated without putting it into contact with a metal salt. This is referred to as the second-step treatment.

The second-step treatment is performed, for example, by holding the glass after the completion of the first-step treatment at a temperature of 350° C. or more in air for a given time. The holding temperature is a temperature of not more than the strain point of the glass for chemical strengthening and is preferably not more than a temperature higher by 10° C. than the first-step treatment temperature, more preferably the same temperature as the first-step treatment temperature.

According to this treatment, it is believed that alkali ions introduced into the glass surface by the first-step treatment are thermally diffused and in turn, CT is reduced.

Next, the glass after the completion of the second-step treatment is put into contact with a third metal salt containing potassium (K) ions, and a large compressive stress is generated in the glass surface by ion-exchange of K ions in the metal salt with Na ions in the glass. This ion-exchange treatment is sometimes referred to as "third-step treatment".

The third-step treatment is the same as that in the strengthening treatment method 1, and description thereof is omitted.

In the strengthening treatment method 2, the sum total of the first-step to third-step treatment times can be 24 hours or less and therefore, the productivity is advantageously high. The sum total of treatment times is more preferably 15 hours or less, still more preferably 10 hours or less.

According to the strengthening treatment method 1, the stress profile can be precisely controlled by adjusting the composition of the second metal salt used for the second-step treatment or the treatment temperature.

According to the strengthening treatment method 2, a chemically strengthened glass having excellent properties can be obtained by a relatively simple treatment at low cost.

As for the treatment conditions of the chemical strengthening treatment, the time and temperature, etc. may be appropriately selected by taking into account, e.g., the properties and composition of the glass or the type of the molten salt.

Through these procedures, a chemically strengthened glass is produced.

Next, an uneven profile is formed by applying an antiglare treatment to the above-described chemically strengthened glass to form a first rough region 27. The surface to which an antiglare treatment is not applied works out to a first smooth region 25 and a second smooth region 29 in the normal glass production method.

The uneven profile can be formed by a known method. There can be utilized a method in which a chemical or physical surface treatment is applied to the glass substrate surface to form an etching layer and form an uneven profile having a desired surface roughness, or a method in which a coating layer is formed by means of an antiglare film or an electrostatic spray.

When the antiglare layer is an etching layer, this is advantageous in that an antiglare material need not be separately applied. When the antiglare layer is a coating layer, this is advantageous in that control of the antiglare property is facilitated by selecting the material.

In this connection, an uneven profile may be formed before chemical strengthening treatment, or an uneven profile may be formed after chemical strengthening treatment. In the case of forming an etching layer before chemical strengthening treatment, reduction in CS of the surface of the strengthened layer due to etching can be suppressed, facilitating control of the strength. In the case of forming a spray layer before chemical strengthening treatment, the authentication section can be more largely deformed, making it easy for a finger to recognize the authentication section. In the case of forming an etching layer after chemical strengthening treatment, fine deformation of the surface profile after etching can be suppressed, making it easy to control the surface properties. In the case of forming a spray layer after chemical strengthening treatment, deformation of the main body can be suppressed and therefore, a more flat cover glass is obtained.

The method for chemically performing the antiglare treatment includes a frost treatment. The frost treatment can be realized, for example, by immersing the glass substrate as a treatment target in a mixed solution of hydrogen fluoride and ammonium fluoride. At this time, by controlling the mixing ratio of the mixed solution or the immersion time, Ssk can be adjusted to be less than 0.

As the method for physically performing the antiglare treatment, there may be utilized, for example, a sandblast treatment in which a crystalline silicon dioxide powder, a silicon carbide powder, etc. is blown toward a main surface of the glass substrate with pressurized air, and a method in which the main surface is rubbed using a brush attached with a crystalline silicon dioxide powder, a silicon carbide powder, etc. and wet with water. At this time, Ssk can be made to be 0 or more, in the case of sandblasting, by controlling the particle size of the powder or the pressurizing force and, in the case of a method of rubbing with a brush, by controlling the particle size of the powder used or the rubbing force.

[Action and Effect]

In the antiglare transparent substrate 1, irrespective of the position of the first rough region 27, the first smooth region 25 and the second smooth region 29 are at least partially facing each other and therefore, a difference in the stress distribution due to the difference in the surface profile between the first main surface 21 and the second main surface 22 is hardly caused in the regions facing each other. Consequently, even in the case of providing both a surface subjected to antiglare treatment and a surface not subjected to antiglare treatment, warpage can be reduced.

Since the surface roughness of the first rough region 27 is more than 2 nm and 1,000 nm or less in terms of the arithmetic average roughness Ra, the visible light incident on the first rough region 27 from the first main surface 21 side can be scattered to blur disturbing reflection by incident light. Accordingly, the first rough region 27 can be favorably used as a surface subjected to antiglare treatment.

In the antiglare transparent substrate 1, when the ratio $Z_1/Z_0$ of the atomic composition ratio $Z_1$ in the first rough region 27 to the atomic composition ratio $Z_0$ in the first smooth region 25 is less than 1, the surface is rich in Si and in turn, the surface hardness increases, so that the abrasion resistance can be enhanced. In addition, when $Z_1/Z_0$ is from 1 to 1.1, at the time of stacking an antireflection layer where the alkali metal composition ratio K/(Li+Na+K) is larger in the surface treatment layer compared with the central part in the thickness-direction sectional view of the antiglare transparent substrate 1, the layer is less likely to act as an optically heterogeneous layer, and an excellent antiglare transparent substrate 1 is obtained.

When the skewness (Ssk) of the surface of the first rough region 27 is 0 or more, the peak width of a projection of the first rough region 27 is narrowed, and an effect of enhancing the finger slipperiness or making a fingerprint be less marked can be expected.

When the skewness (Ssk) of the surface of the first rough region 27 is 0.2 or more, light scattering on the glass surface increases, and this is effective in reducing the sparkle of the glass surface.

When the skewness (Ssk) of the first rough region 27 is less than 0, the peak width of a projection recess of the first rough region is narrowed, and abrasion resistance can be enhanced.

When the skewness (Ssk) of the surface of the first rough region 27 is less than −0.2, this is effective in eliminating gloss or luster of the glass surface layer, and the antiglare effect increases.

Assuming the tensile stress to be a positive value and the compressive stress to be a negative value, since the plate-thickness-direction stress integrated value S of the first smooth region 25 is less than 0 MPa, a compressive stress is generated in the plate thickness direction of the transparent substrate 2 including the first smooth region 25 and consequently, the transparent substrate 2 is resistant to breakage by impact on the first smooth region 25.

Since the plate-thickness-direction stress integrated value S of the first smooth region 25 is less than −3 MPa, a higher compressive stress is generated in the plate thickness direction of the transparent substrate 2 including the first smooth region 25 and consequently, the transparent substrate 2 is further resistant to breakage by impact on the first smooth region 25.

Since the surface compressive stress CS of the first smooth region 25 is larger than the surface compressive stress CS of the first rough region 27, when an impact is applied to the antiglare transparent substrate 1, the first smooth region 25 is more resistant to breakage. Accordingly, in the case of using the first smooth region 25 for fingerprint authentication, etc., non-authenticability due to external impact is less likely to occur.

Since the surface compressive stress CS of the first smooth region 25 and first rough region 27 is 500 MPa or more, when an impact is applied to the antiglare transparent substrate 1, the antiglare transparent substrate is further resistant to breakage.

[Modification Example]

The present invention is not limited to only the above-described embodiment, and various improvements, design changes, etc. can be made therein without departing from the gist of the present invention. Specific procedures, structures, etc. at the time of implementing the present invention may be changed to other structures, etc. as long as the object of the present invention can be attained.

As the transparent substrate 2, a substrate having various shapes and made of various materials can be used according to usage.

Figure 2:
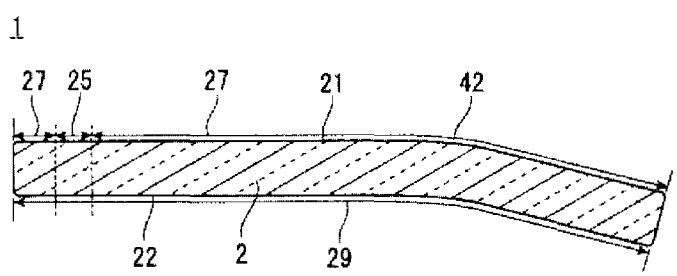
FIG. 2 is a cross-sectional diagram illustrating a modification example of the antiglare transparent substrate according to this embodiment.

As for the shape, the transparent substrate may be not only a plate having only flat faces but also, for example, a plate having at least partially a curved face or a plate having a recess portion. In the case of using a bent glass, even when the partner-side member on which the antiglare transparent substrate 1 is mounted has a bent shape, the mounting accuracy can be prevented from reduction. For example, as illustrated in FIG. 2, a bent glass having a bent portion 42 in the first rough region 27 may be used. In this case, since the authentication section maintains flatness, a device of the authentication section is easily assembled. A bent glass having a bent portion 42 in the first smooth region 25 may also be used. In this case, it is easier for a finger to recognize the authentication section. Furthermore, a bent glass including both may be used. In this case, a good looking appearance is presented. In addition, the antiglare transparent substrate 1 may have a film shape. The antiglare transparent substrate 1 may have a hole portion or may have a partially notched region.

The material includes a glass in which the composition of the tensile stress layer 28 satisfies any one requirement of the following (i) to (vii). The glass compositions (i) to (v) are a composition represented by mol % based on oxides, and the glass compositions (vi) to (vii) are a composition represented by mass % based on oxides. As for the composition of the tensile stress layer 28, the composition at the center in the plate thickness direction of the glass may be analyzed by a known method such as EDX and ICP, etc.

(i) A glass containing from 50 to 80% of $SiO_2$, from 2 to 25% of $Al_2O_3$, from 0 to 10% of $Li_2O$, from 0 to 18% of $Na_2O$, from 0 to 10% of $K_2O$, from 0 to 15% of MgO, from 0 to 5% of CaO, and from 0 to 5% of $ZrO_2$.

(ii) A glass containing from 50 to 74% of $SiO_2$, from 1 to 10% of $Al_2O_3$, from 6 to 14% of $Na_2O$, from 3 to 11% of $K_2O$, from 2 to 15% of MgO, from 0 to 6% of CaO, and from 0 to 5% of $ZrO_2$, in which the total of the contents of $SiO_2$ and $Al_2O_3$ is 75% or less, the total of the contents of $Na_2O$ and $K_2O$ is from 12 to 25%, and the total of the contents of MgO and CaO is from 7 to 15%.

(iii) A glass containing from 68 to 80% of $SiO_2$, from 4 to 10% of $Al_2O_3$, from 5 to 15% of $Na_2O$, from 0 to 1% of $K_2O$, from 4 to 15% of MgO, and from 0 to 1% of $ZrO_2$, in which the total of the contents of $SiO_2$ and $Al_2O_3$ is 80% or less.

(iv) A glass containing from 67 to 75% of $SiO_2$, from 0 to 4% of $Al_2O_3$, from 7 to 15% of $Na_2O$, from 1 to 9% of $K_2O$, from 6 to 14% of MgO, from 0 to 1% of CaO, and from 0 to 1.5% of $ZrO_2$, in which the total of the contents of $SiO_2$ and $Al_2O_3$ is from 71 to 75% and the total of the contents of $Na_2O$ and $K_2O$ is from 12 to 20%.

(v) A glass containing from 60 to 75% of $SiO_2$, from 0.5 to 8% of $Al_2O_3$, from 10 to 18% of $Na_2O$, from 0 to 5% of $K_2O$, from 6 to 15% of MgO, and from 0 to 8% of CaO.

(vi) A glass containing from 63 to 75% of $SiO_2$, from 3 to 12% of $Al_2O_3$, from 3 to 10% of MgO, from 0.5 to 10% of CaO, from 0 to 3% of SrO, from 0 to 3% of BaO, from 10 to 18% of $Na_2O$, from 0 to 8% of $K_2O$, from 0 to 3% of $ZrO_2$, and from 0.005 to 0.25% of $Fe_2O_3$, in which $R_2O/Al_2O_3$ (wherein $R_2O$ is $Na_2O+K_2O$) is 2.0 or more and 4.6 or less.

(vii) A glass containing from 66 to 75% of $SiO_2$, from 0 to 3% of $Al_2O_3$, from 1 to 9% of MgO, from 1 to 12% of CaO, from 10 to 16% of $Na_2O$, and from 0 to 5% of $K_2O$.

The thickness of the antiglare transparent substrate 1 is preferably 2 mm or less. When the thickness is 2 mm or less, the mass of the antiglare transparent substrate 1 can be decreased to achieve weight reduction, and furthermore, when a fingerprint authentication section, etc. is provided between the antiglare transparent substrate 1 and the display panel, the authentication accuracy can be enhanced. The thickness is preferably 0.1 mm or more. A glass having a thickness of 0.1 mm or more is advantageous in that an antiglare transparent substrate 1 having both high strength and good texture is obtained. The thickness is more preferably 0.2 mm or more and 1.5 mm or less, still more preferably 0.3 mm or more and 1.5 mm or less.

Figure 3:
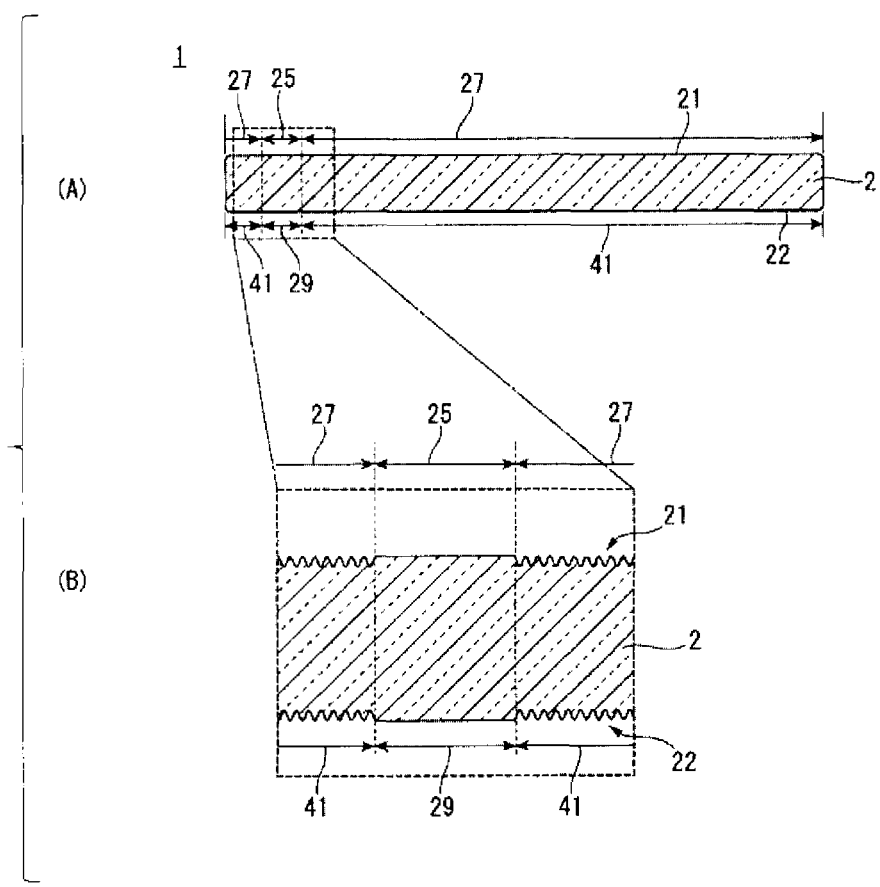
FIG. 3 is diagram illustrating a modification example of the antiglare transparent substrate according to this embodiment: (A) is a cross-sectional diagram and (B) is an enlarged diagram of the region surrounded by a dotted line in (A).

As illustrated in FIG. 3, the second main surface 22 may have a second rough region 41 whose surface roughness in terms of the arithmetic average roughness is larger than that of the second smooth region 29. As with the first rough region 27, in the case where the object to be protected by the antiglare transparent substrate 1 is a smartphone, the second rough region 41 corresponds to the antiglare-treated region facing the display area.

By having a second rough region 41 as the rough region also on the second main surface 22, the antiglare property can be exhibited also for visible light incident from the second main surface 22 side. In addition, by having a second rough region 41 also on the second main surface 22, separation of an adhesive layer or a printing layer is less likely to occur due to anchor effect.

The surface roughness of the second roughness region 41 is on the same level as that of the first roughness region 27 and, for example, in terms of the arithmetic average roughness Ra, preferably more than 2 nm and 1,000 nm or less, more preferably 5 nm or more and 200 nm or less. The reason therefor is the same as for the first rough region 27. Visible light incident on the second rough region 41 from the second main surface 22 side can be scattered to blur disturbing reflection by incident light. Accordingly, the second rough region 41 can be favorably used as a surface subjected to antiglare treatment.

The uneven profile of the second rough region 41 is not particularly limited as long as it is an uneven profile applicable to the first rough region 27. Also, Ssk may be a value on the same level as that of the first rough region 27.

Figure 4:
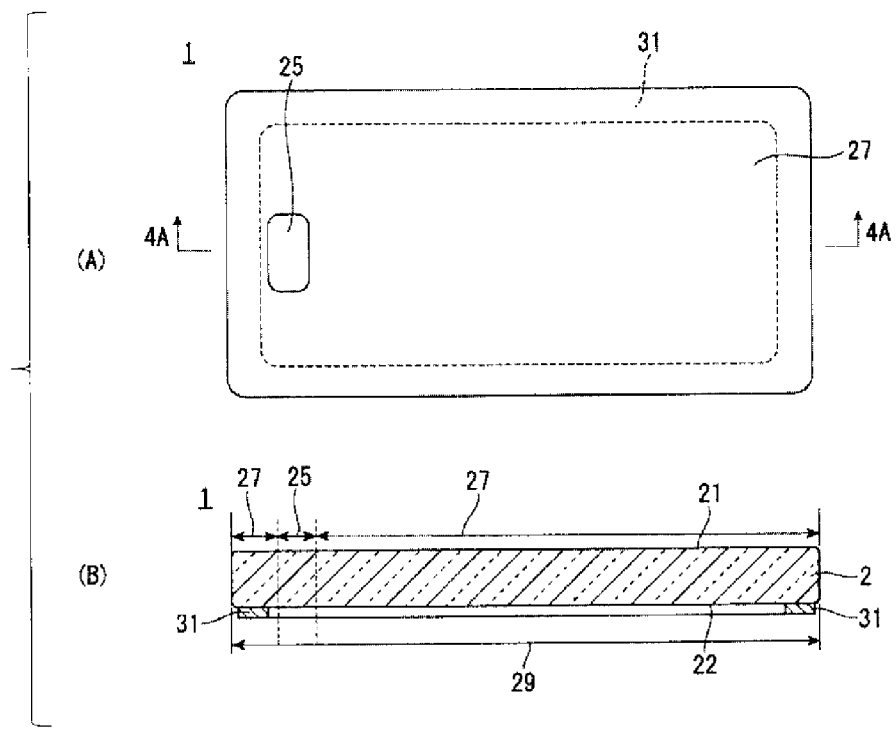
FIG. 4 is a diagram illustrating a modification example of the antiglare transparent substrate according to this embodiment: (A) is a plan view and (B) is a 4A-4A cross-sectional diagram of (A).

As illustrated in FIG. 4, the antiglare transparent substrate 1 may have a light-shielding layer 31 provided on the second main surface 22. The light-shielding layer 31 is a layer blocking visible light and, specifically, is a layer whose luminous transmittance of, for example, light having a wavelength of 380 to 780 nm is 50% or less. In the case of having the light-shielding layer 31, the layer can conceal wiring on the display device side or block illumination light of backlight to thereby prevent leakage of illumination light from the periphery of the display device.

The second main surface 22 on which the light-shielding layer 31 is provided may be subjected to primer treatment or etching treatment, etc. so as to more increase the adhesion to the light-shielding layer 31.

The method for providing the light-shielding layer 31 is not particularly limited but includes a method in which the layer is provided by printing an ink by a bar coating method, a reverse coating method, a gravure coating method, a die coating method, a roll coating method, a screen method, an inkjet method, an off-set method, etc. In consideration of ease of thickness control, an inkjet method is preferred.

The ink used for the light-shielding ink 31 may be an inorganic ink or an organic ink. The inorganic ink may be a composition composed of, for example, one or more selected from $SiO_2$, ZnO, $B_2O_3$, $Bi_2O_3$, $Li_2O$, $Na_2O$ and $K_2O$, one or more selected from CuO, $Al_2O_3$, $ZrO_2$, $SnO_2$ and $CeO_2$, $Fe_2O_3$, and $TiO_2$.

As the organic ink, various printing materials obtained by dissolving a resin in a solvent can be used. For example, as the resin, at least one resin selected from the group consisting of an acrylic resin, a urethane resin, an epoxy resin, a polyester resin, a polyamide resin, a vinyl acetate resin, a phenol resin, an olefin, an ethylene-vinyl acetate copolymer resin, a polyvinyl acetal resin, natural rubber, a styrene-butadiene copolymer, an acrylonitrile-butadiene copolymer, polyester polyol, and polyether polyurethane polyol, etc. may be used. As the solvent, water, alcohols, esters, ketones, an aromatic hydrocarbon-based solvent, or an aliphatic hydrocarbon-based solvent may be used. For example, as the alcohols, isopropyl alcohol, methanol, and ethanol, etc. can be used; as the esters, ethyl acetate can be used; and as the ketones, methyl ethyl ketone can be used. As the aromatic hydrocarbon-based solvent, toluene, xylene, Solvesso (registered trademark) 100, and Solvesso (registered trademark) 150, etc. can be used, and as the aliphatic hydrocarbon-based solvent, hexane, etc. can be used. Incidentally, the materials recited above are exemplary, and other various printing materials can be used. The organic printing material above is applied to the transparent substrate 2, and then the solvent is evaporated, whereby a resin light-shielding layer 31 can be formed. The printing material is not particularly limited and may be either a thermosetting ink that is curable by heating, or a UV-curable resin.

The ink used for the light-shielding layer 31 may contain a coloring agent. As to the coloring agent, for example, in the case of making the light-shielding layer 31 black, a black coloring agent such as carbon black can be used. In addition, a coloring agent of a suitable color can be used according to the desired color.

The light-shielding layer 31 may be stacked a desired number of times, and as the ink used for printing, different inks may be used for respective layers. In addition, as well as printed only on one main surface, the light-shielding layer 31 may be printed on another main surface and may also be printed on an end face.

In the case of stacking the light-shielding layer 31 a desired number of times, the ink used may differ among respective layers. For example, in the case of intending to make the light-shielding layer 31 look white when the user views the antiglare transparent substrate 1 from the first main surface 21 side, this may be fulfilled by printing the first layer in white color and subsequently printing the second layer in black color. Thanks to this configuration, a white light-shielding layer 31 reduced in the so-called "see-through feeling" relating to visibility of the back side of the light-shielding layer 31 when a user views the light-shielding layer 31 from the first main surface 21 side, can be formed.

The planar shape of the light-shielding layer 31 is a frame shape in FIG. 4, in which the inside of the frame constitutes a display region, but the planar shape may not be a frame shape and may be a linear shape extending along one side of the second main surface 22, an L-shape extending along continuous two sides, or a shape formed by two straight lines extending along two sides facing each other. In the case where the second main surface 22 has a polygonal shape other than a quadrangular shape or has a circular shape or a deformed shape, the light-shielding layer 31 may have a frame shape matching such a shape, a linear shape extending along one side of the polygonal shape, or an arc shape extending along a part of the circular shape.

In the case of using the antiglare transparent substrate 1 for a display device, the light-shielding layer 31 preferably has a color corresponding to the color of the display device in a non-display mode. For example, in the case where the color in a non-display mode is black, it is preferred that the light-shielding layer 31 is also black.

Figure 5:
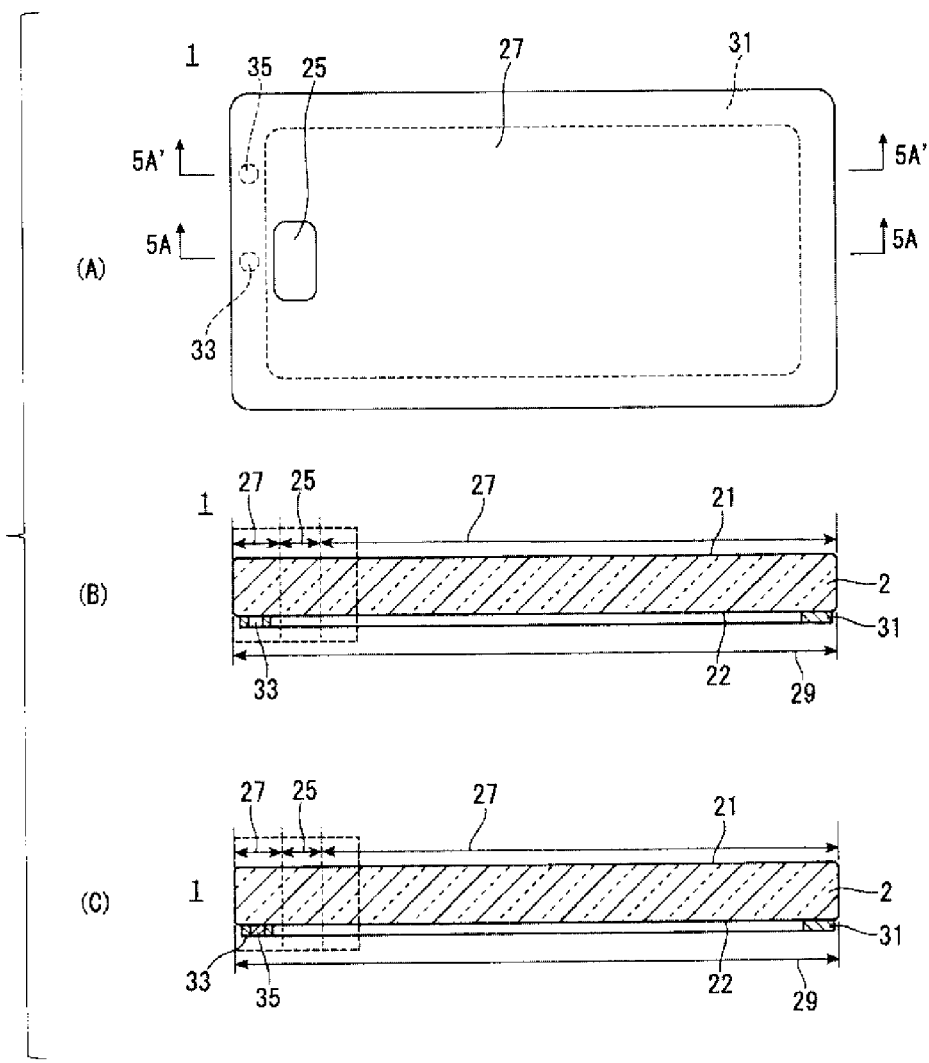
FIG. 5 is a diagram illustrating a modification example of the antiglare transparent substrate according to this embodiment: (A) is a plan view, (B) is a 5A-5A cross-sectional diagram of (A), and (C) is a 5A'-5A' cross-sectional diagram of (A).

In the case where the antiglare transparent substrate 1 has a light-shielding layer 31, as illustrated in (A) and (B) of FIG. 5, the light-shielding layer 31 may have an opening 33. When an opening 33 is provided, in order for an opening 33 to transmit visible light, the shape of the opening 33 is formed to correspond to characters, figures or symbols constituting a logo mark of a product, and the logo mark can thereby be displayed in the opening 33 only when illumination light of the display device is on.

As illustrated in (A) and (C) of FIG. 5, an infrared-transmitting layer 35 having a higher infrared transmittance than that of the light-shielding layer 31 may be provided in the opening 33. When the infrared-transmitting layer 35 is provided, an infrared sensor can be provided on the back side of the light-shielding layer 31 and at the same time, the infrared-transmitting layer 35 can be obscured.

The ink for forming the infrared-transmitting layer 35 may be either an inorganic ink or an organic ink. The pigment contained in the inorganic ink may be a composition composed of, for example, one or more selected from $SiO_2$, $ZnO$, $B_2O_3$, $Bi_2O_3$, $Li_2O$, $Na_2O$ and $K_2O$, one or more selected from $CuO$, $Al_2O_3$, $ZrO_2$, $SnO_2$ and $CeO_2$, $Fe_2O_3$, and $TiO_2$.

As the organic ink, various printing materials obtained by dissolving a resin and a pigment in a solvent can be used. For example, as the resin, at least one resin selected from the group consisting of an acrylic resin, a urethane resin, an epoxy resin, a polyester resin, a polyamide resin, a vinyl acetate resin, a phenol resin, an olefin, an ethylene-vinyl acetate copolymer resin, a polyvinyl acetal resin, natural rubber, a styrene-butadiene copolymer, an acrylonitrile-butadiene copolymer, polyester polyol, and polyether polyurethane polyol, etc. may be used. As the solvent, water, alcohols, esters, ketones, an aromatic hydrocarbon-based solvent, or an aliphatic hydrocarbon-based solvent may be used. For example, as the alcohols, isopropyl alcohol, methanol, and ethanol, etc. can be used; as the esters, ethyl acetate can be used; and as the ketones, methyl ethyl ketone can be used. As the aromatic hydrocarbon-based solvent, toluene, xylene, Solvesso (registered trademark) 100, and Solvesso (registered trademark) 150, etc. can be used, and as the aliphatic hydrocarbon-based solvent, hexane, etc. can be used. The materials recited above are exemplary, and other various printing materials can be used. The organic printing material above is applied to the transparent substrate 2, and then the solvent is evaporated, whereby a resin infrared-transmitting layer 35 can be formed. The printing material is not particularly limited and may be either a thermosetting ink that is curable by heating, or a UV-curable resin.

The ink used for the infrared-transmitting layer 35 may contain a pigment. As the pigment, for example, in the case of making the infrared-transmitting layer 35 black, a black pigment such as carbon black can be used. In addition, a pigment of a suitable color can be used according to the desired color.

The content ratio of the pigment in the infrared-transmitting layer 35 may be freely changed according to the desired optical properties. The content ratio, which is a ratio of the content of the pigment to the total mass of the infrared-transmitting layer 35, is preferably from 0.01 to 10 mass %. The content ratio can be realized by adjusting the content ratio of the infrared-transparent material relative to total mass of the ink.

In the ink for forming the infrared-transmitting layer 35, a photo-curable resin or a thermosetting resin contains a pigment having an infrared transmitting ability. As the pigment, either an inorganic pigment or an organic pigment can be used. The inorganic pigment includes iron oxide, titanium oxide, a composite oxide-based pigment, etc. The organic pigment includes a metal complex-based pigment, etc., such as phthalocyanine-based pigment, anthraquinone-based pigment and azo-based pigments. The color of the infrared-transmitting layer 35 is preferably the same as that of the light-shielding layer 31. In the case where the light-shielding layer 31 is black, it is preferable that the infrared-transmitting layer 35 is also black.

The method for forming the infrared-transmitting layer 35 is not particularly limited but includes a bar coating method, a reverse coating method, a gravure coating method, a die coating method, a roll coating method, a screen method, an inkjet method, an off-set method, etc. In consideration of continuity in the manufacturing method, the same formation method as that for the light-shielding layer 31 is preferred.

Figure 6:
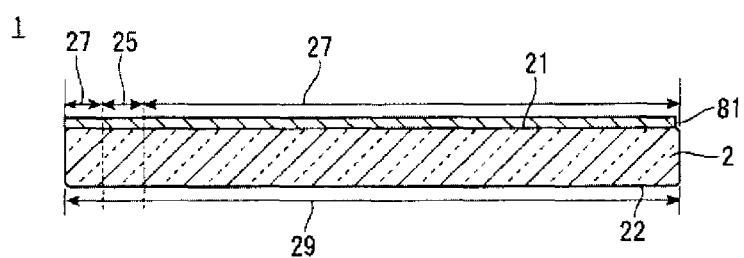
FIG. 6 is a cross-sectional diagram illustrating a modification example of the antiglare transparent substrate according to this embodiment.

As illustrated in FIG. 6, a functional layer 81 including an antireflection layer, an antifouling layer, etc. may be provided on at least one of the first main surface 21 and second main surface 22 of the antiglare transparent substrate 1.

<Antireflection Layer>

The antireflection layer indicates a layer that produces an effect of decreasing the reflectance, reduces glare ascribable to disturbing reflection of light, and when used in a display device, can increase the transmittance of light from the display device and enhance the visibility of the display device. When the functional layer 81 includes an antireflection layer, the antireflection layer is provided on either main surface, so that reflection of light incident from the second main surface 22 side can be prevented and disturbing reflection by incident light can be inhibited.

In the case where the functional layer 81 is an antireflection layer, the antireflection layer preferably has a structure in which a high-refractive-index layer having a refractive index of 1.9 or more for light with a wavelength of 550 nm and a low-refractive-index layer having a refractive index of 1.6 or less for light with a wavelength of 550 nm are stacked. Thanks to the structure of the antireflection layer in which the high-refractive-index layer and the low-refractive-index layer are stacked, reflection of visible light can be more unfailingly prevented.

As for the number of layers, the antireflection layer may have a configuration including one high-refractive-index layer and one low-refractive-index layer but may have a configuration including two or more high-refractive-index layers and two or more low-refractive-index layers. In the case of a configuration including one high-refractive-index layer and one low-refractive index-layer, the high-refractive-index layer and the low-refractive-index layer are preferably stacked in this order on the second main surface 22 of the antiglare transparent substrate 1. In the case of a configuration including two or more high-refractive-index layers and two or more low-refractive-index layers, a laminate in which the high-refractive-index layers and the low-refractive-index layers are stacked alternately in this order is preferred. The total number of layers in the laminate is preferably 2 or more and 8 or less, more preferably 2 or more and 6 or less, still more preferably 2 or more and 4 or less. Furthermore, a layer may be added as long as the optical properties are not impaired. For example, a $SiO_2$ film may be inserted between the glass and the first layer so as to prevent diffusion of Na from the glass plate.

The materials constituting the high-refractive-index layer and low-refractive-index layer are not particularly limited and may be selected in consideration of the required degree of antireflection or the required productivity. The material constituting the high-refractive-index layer includes, for example, niobium oxide ($Nb_2O_5$), titanium oxide ($TiO_2$), zirconium oxide ($ZrO_2$), tantalum oxide ($Ta_2O_5$), aluminum oxide ($Al_2O_3$), silicon nitride (SiN), etc. One or more selected from these materials can be preferably used. The material constituting the low-refractive-index layer includes, for example, silicon oxide (particularly, silicon dioxide $SiO_2$), a material containing a mixed oxide of Si and Sn, a material containing a mixed oxide of Si and Zr, a material containing a mixed oxide of Si and Al, etc. One or more selected from these materials can be preferably used.

The antireflection layer can be more suitably formed by a method of forming an inorganic thin film directly on the surface, a method of performing a surface treatment by means of etching, etc., or a dry method such as a chemical vapor deposition (CVD) method or a physical vapor deposition (PVD) method, particularly by a vacuum deposition method or a sputtering method, which are a kind of physical vapor deposition method.

The thickness of the antireflection layer is preferably 100 nm or more and 500 nm or less. When the thickness of the antireflection layer is 100 nm or more, this is advantageous in that reflection of external light can be effectively suppressed.

The antireflection layer preferably has A* of −6 to 1 and B* of −8 to 1 in CIE (International Commission on Illumination) color difference system. When the antireflection layer has A* of −6 to 1 and B* of −8 to 1, the antireflection layer is unlikely to take on a danger color (warning color), and the color of the antireflection layer can be prevented from outstanding.

<Antifouling Layer>

The antifouling layer indicates a layer suppressing adhesion of an organic substance or an inorganic substance, or a layer producing an effect that even when an organic substance or an inorganic substance is attached, the attached matter can be easily removed by cleaning such as wiping off. When an antiglare layer is provided as the functional layer 81, adhesion of dirt such as fingerprint, sebum, sweat, etc. can be reduced even if a finger of a human being touches either main surface.

As the method for forming the antifouling layer, there can be utilized, for example, a vacuum deposition method (dry method) in which a fluorine-containing organic compound, etc. is evaporated in a vacuum tank and attached to the surface of the antireflection layer, or a method (wet method) in which a fluorine-containing organic compound, etc. is dissolved in an organic solvent and the solution is adjusted to a predetermined concentration and applied to the surface of the antireflection layer.

The method may be appropriately selected, as the dry method, from an ion beam-assisted deposition method, an ion plating method, a sputtering method, a plasma CVD method, etc., and as the wet method, from a spin coating method, a dip coating method, a casting method, a slit coating method, a spraying method, etc. Either the dry method or the wet method can be used. In view of abrasion resistance, it is preferable to use a dry film deposition method.

The material of the antifouling layer can be appropriately selected from a fluorine-containing organic compound, etc. capable of imparting antifouling property, water repellency, and oil repellency. Specifically, the material includes a fluorine-containing organic silicon compound and a fluorine-containing hydrolyzable silicon compound. The fluorine-containing organic compound can be used with no particular limitation as long as it can impart antifouling property, water repellency, and oil repellency.

In the case where an antireflection layer is formed on a main surface of the transparent substrate 2 or on a treated surface of the antiglare layer, a coating of the fluorine-containing organic silicon compound forming the antifouling layer is preferably formed on the surface of the antireflection layer. Furthermore, in the case where a glass plate on which the antireflection layer is not formed is used as the transparent substrate 2, a coating of the fluorine-containing organic silicon compound is preferably formed directly on the surface subjected to the surface treatment.

The method for forming a coating of the fluorine-containing organic silicon compound includes, for example, a method in which a composition of a silane coupling agent having a fluoroalkyl group such as a perfluoroalkyl group or a fluoroalkyl group containing a perfluoro(polyoxyalkylene) chain is applied by a spin coating method, a dip coating method, a casting method, a slit coating method, a spray coating method, etc. and the coating is then heat-treated, and a vacuum deposition method in which a fluorine-containing organic silicon compound is vapor-deposited and the coating is then heat-treated. In order to obtain a fluorine-containing organic silicon compound coating with high adhesion, the coating is preferably formed by the vacuum deposition method. For the formation of a fluorine-containing organic silicon compound coating by the vacuum deposition method, a coating-forming composition containing a fluorine-containing hydrolyzable silicon compound is preferably used.

In the antifouling layer, the fluorine-containing hydrolyzable silicon compound used for the formation of a fluorine-containing organic silicon compound coating is not particularly limited as long as the fluorine-containing organic silicon compound coating obtained has an antifouling property such as water repellency or oil repellency. Specifically, the compound includes a fluorine-containing hydrolyzable silicon compound containing one or more selected from the group consisting of a perfluoropolyether group, a perfluoroalkylene group, and a perfluoroalkyl group.

The thickness of the antifouling layer is not particularly limited but is preferably 2 nm or more and 20 nm or less, more preferably 2 nm or more and 15 nm or less, still more preferably 3 nm or more and 10 nm or less. When the thickness of the antifouling layer is not less than the lower limit value, a state where the surface of the antireflection layer is uniformly covered with the antifouling layer is provided, and from the aspect of abrasion resistance, the antiglare transparent substrate 1 can withstand the practical use. In addition, when the thickness of the antifouling layer is not more than the upper limit value, optical properties such as luminous transmittance and haze value, etc. in the state of the antifouling layer being stacked are improved.

The functional layer 81 is not limited to a single layer of either the antireflection layer or the antifouling layer. Two or more kinds of layers may be stacked. A protective layer may further be provided on the functional layer 81.

The antiglare transparent substrate 1 of the present invention can be used, for example, as a cover member for display devices, including a cover glass of a panel display such as liquid crystal display or organic EL display, an in-vehicle information device, or a portable device. When the antiglare transparent substrate 1 of the present invention is used as a cover for display devices, the object to be covered can be protected while ensuring the visibility.

In the case of using the antiglare transparent substrate 1 for a display device and in the case where a light-shielding layer 31 is provided, the light-shielding layer 31 preferably has a color corresponding to the color of the display device in a non-display mode. For example, in the case where the color in the non-display mode is black, it is preferred that the light-shielding layer 31 is also black.

The light-shielding layer 31 may constitute a pattern of an article using the antiglare transparent substrate 1 therein and enhance the design property of the article.

Here, an example of a display device equipped with the antiglare transparent substrate 1 is described.

Figure 7:
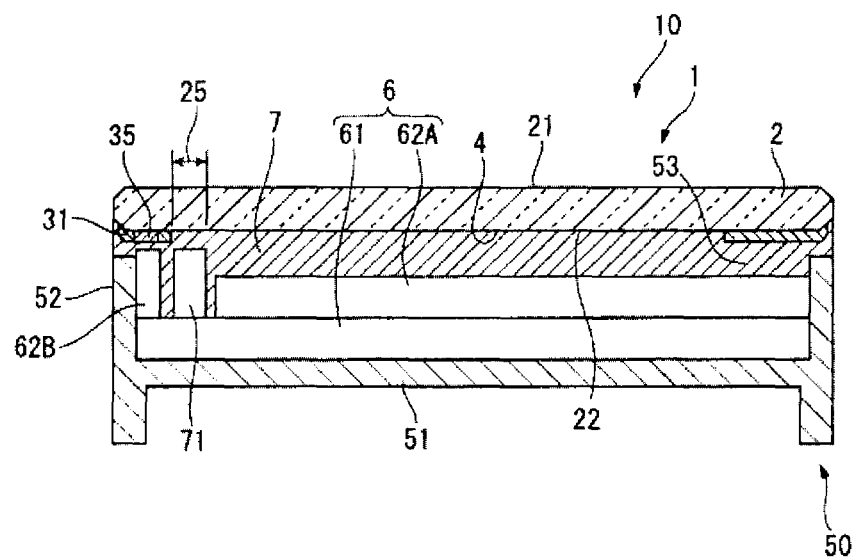
FIG. 7 is a cross-sectional diagram illustrating a display device including the antiglare transparent substrate according to this embodiment.

The display device 10 illustrated in FIG. 7 has a frame 50. The frame 50 has a bottom portion 51, a side wall 52 crossing the bottom portion 51, and an opening 53 facing the bottom portion 51. A liquid crystal module 6 is disposed in a space surrounded by the bottom portion 51 and the side wall 52. The liquid crystal module 6 has a backlight 61 disposed on the bottom portion 51 side, a liquid crystal panel 62A disposed on the backlight 61, an infrared sensor 62B, and a fingerprint authentication sensor 71.

The antiglare transparent substrate 1 is provided on the top of the frame 50 so that the second main surface 22 faces the liquid crystal module 6 side. With respect to the antiglare transparent substrate 1, a part of the light-shielding layer 31 is bonded to the frame 50 and a part of the light-shielding layer 31 and the display portion 4 of the second main surface 22 is bonded to the liquid crystal module 6, each through an adhesive layer 7 provided in the opening 53 and on the top surface of the side wall 52. The infrared-transmitting layer 35 is disposed at a position facing the infrared sensor 62B. The first smooth region 25 is disposed at a position facing the fingerprint authentication sensor 71.

It is preferred that the adhesive layer 7 is transparent and has a small refractive index difference from the antiglare transparent substrate 1.

The adhesive layer 7 includes, for example, a layer composed of a transparent resin and obtained by curing a liquid, curable resin composition. The curable resin composition includes, for example, a photocurable resin composition and a thermosetting resin composition, etc., and among these, a photocurable resin composition containing a curable compound and a photopolymerization initiator is preferred. The curable resin composition is applied using, for example, a method such as die coater, roll coater, etc. to form a curable resin composition film.

The adhesive layer 7 may be an OCA (Optical Clear Adhesive) film (OCA tape). In this case, the OCA film may be bonded to the second main surface 22 side of the antiglare transparent substrate 1.

The thickness of the adhesive layer 7 is preferably 5 μm or more and 400 μm or less, more preferably 50 μm or more and 200 μm or less. The shear storage modulus of the adhesive layer 7 is preferably 5 kPa or more and 5 MPa or less, more preferably 1 MPa or more and 5 MPa or less.

The assembling order at the time of manufacture of the display device 10 is not particularly limited. For example, the assembling order may be an order of previously preparing a structural body in which the adhesive layer 7 is disposed on the antiglare transparent substrate 1, mounting the structural body on the frame 50, and thereafter bonding the liquid crystal module 6.

The display device 10 may include a touch sensor, etc. In the case of incorporating a touch sensor, the touch sensor is disposed on the second main surface 22 side of the antiglare transparent substrate 1 via another adhesive layer (not shown), and the liquid crystal module 6 is disposed thereon via the adhesive layer 7.

EXAMPLES

Examples of the present invention are described below. The present invention is not limited to the following Examples.

The deformation amount and stress distribution were compared by performing a chemical strengthening simulation under various conditions. Specific procedures are as follows. Ex. 1 and Ex. 2 are Examples, Ex. 3 and Ex. 4 are Comparative Examples, and Ex. 5 is Reference Example for comprehending the deformation amount and stress distribution after chemical strengthening in the case of not providing a rough region.

Ex. 1

Figure 8:
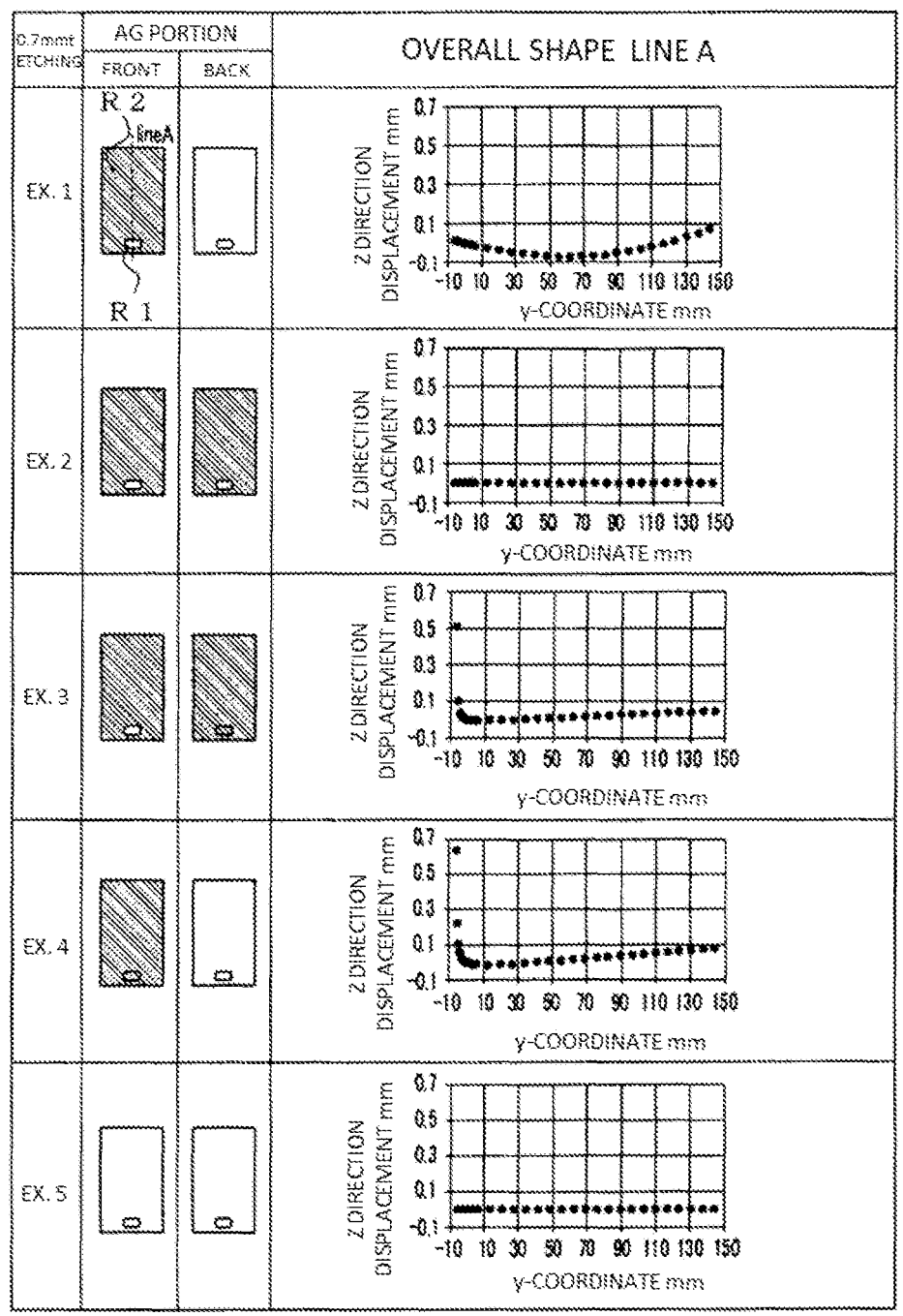
FIG. 8 is a graph illustrating the overall shape in Examples.

The simulation was performed assuming, as a glass before chemical strengthening, a glass substrate having a Z direction thickness (plate thickness) of 0.7 mm and a vertical and horizontal 150 mm×72 mm main surface. The long side direction (longitudinal direction) of the glass substrate is designated as y direction, and the short side direction (transverse direction) is designated as x direction. On the first main surface 21 of the glass substrate, as illustrated in FIG. 8, a region R1 assuming a fingerprint authentication section (FIG. 11) is supposed to be a first smooth region 25 (supposing arithmetic average roughness Ra=1 nm). The region R1 was a vertical and horizontal 6 mm×17 mm region having a curvature radius of corner a part of 3 mm with its center being located at the position P that is 36 mm in the transverse direction from short-side-direction one end and 6 mm in the longitudinal direction from the long-side-direction lower end.

Next, as illustrated in FIG. 8, a region R2 assuming a first rough region 27 was assigned to the entire surface except for the region R1 of one surface (first main surface 21) of the glass substrate. The first rough region 27 was supposed to be a region provided by etching (hypothetically, arithmetic average roughness Ra=300 nm). As for the back surface (second main surface 22) assuming a second smooth region 29, the entire surface was supposed to have the same roughness as the first smooth region 25. In FIG. 8, the shaded area is a rough surface, and the white painted area is a smooth surface. The composition of the glass substrate was prepared assuming a composition corresponding to DRAGONTRAIL (registered trademark) manufactured by AGC Inc.

Ex. 2

The simulation was performed assuming the same glass as in Ex. 1 except that in Ex. 1., as illustrated in FIG. 8, on the second main surface 22 side, only a region facing the region R1 was supposed to be the second smooth region 29 and the remaining region was supposed to be a second rough region 41. The surface roughness of the second rough region 41 is supposed to be the same as that of the first rough region 27.

Ex. 3

The simulation was performed assuming the same glass as in Ex. 1 except that in Ex. 1, as illustrated in FIG. 8, the entire surface on the second main surface 22 side was supposed to be a second rough region 41.

Ex. 4

The simulation was performed assuming the same glass as in Ex. 1 except that in Ex. 1, as illustrated in FIG. 8, the entire surface of the first main surface 21 was supposed to be a first rough region 27 and the entire surface of the second main surface 22 was supposed to be a second smooth region 29.

Ex. 5

The simulation was performed assuming the same glass as in Ex. 1 except that in Ex. 1, the entire surface of the first main surface 21 was supposed to be a first smooth region 25 and the entire surface of the second main surface 22 was supposed to be a second smooth region 29.

With respect to Exs. 1 to 5, chemical strengthening is performed using a chemical strengthening simulation model described below.

[Chemical Strengthening Simulation]

For the chemical strengthening simulation, a general-purpose structural analysis "Abaqus" (Ver 6. 13-2) was used. A step of manufacturing an antiglare transparent substrate 1 by chemically strengthening each of the glass substrates of Exs. 1 to 5 was simulated by an unsteady calculation using Abaqus heat conduction analysis in which the "potassium ion concentration distribution" was regarded as the "temperature distribution". In this simulation, the computation was performed using formulae (2) and (3) and using material factors for a potassium nitrate 100 mol % molten salt at 425° C. shown in Table 1. However, the difference in the surface roughness was simulated by setting the mass transfer coefficient of potassium ions to different values between the smooth region and the rough region.

[Math. 1]

$$C_x = C_0 + (C_{eq} - C_0) \left\{ \text{erfc} \frac{x}{2\sqrt{Dt}} - \exp\left(\frac{H}{D}x + \frac{H^2}{D}t\right) \text{erfc}\left(\frac{x}{2\sqrt{Dt}} + \frac{H}{D}\sqrt{Dt}\right) \right\} \quad (2)$$

In formula (2), $C_x$, is the potassium ion concentration [mol %], $C_0$ is the initial potassium ion concentration [mol %], $C_{eq}$ is the equilibrium potassium ion concentration [mol %], D is the diffusion coefficient [m²/s] of potassium ions, H is the mass transfer coefficient [m/s] of potassium ions, t is the time [s], and x is the depth [m] from the glass surface.

[Math. 2]

$$\sigma_x = -\frac{BE}{1-\nu}(C_x - C_{avg}) \quad (3)$$

In formula (3), $\sigma_x$ is the stress [Pa], B is the expansion coefficient, E is the Young's modulus [Pa], ν is the Poisson's ratio, and $C_{avg}$ is the average potassium concentration [mol %] determined according to formula (4):

[Math. 3]

$$C_{avg} = \frac{1}{L}\int_0^L C_x dx \quad (4)$$

In formula (4), L is the half thickness [m] and x is the depth [m] from the glass surface.

TABLE 1

| Name of Material Constant | Symbol | Material Constant | Unit |
|---|---|---|---|
| Initial potassium ion concentration | $C_0$ | 3.97 | mol % |
| Equilibrium potassium ion concentration | $C_{eq}$ | 13.6 | mol % |
| Diffusion coefficient | D | $1.68 \times 10^{-8}$ | $m^2/s$ |
| Mass transfer coefficient (smooth region) | H | $2.5 \times 10^{-11}$ | m/s |
| Mass transfer coefficient (rough region) | H | $1.875 \times 10^{-11}$ | m/s |
| Expansion coefficient | B | $1.06 \times 10^{-3}$ | — |
| Young's modulus | E | $7.40 \times 10^{10}$ | $N/m^2$ |
| Poisson's ratio | ν | 0.22 | — |

Setting the chemical strengthening temperature to 425° C. and the chemical strengthening time to 2 hours, the overall shape, the shape of region R1, the plate-thickness-direction stress integrated value S, the surface compressive stress CS, the sectional stress, and the maximum value $CT_{max}$ of internal tensile stress were determined based on formulae (2) to (4).

Figure 9:
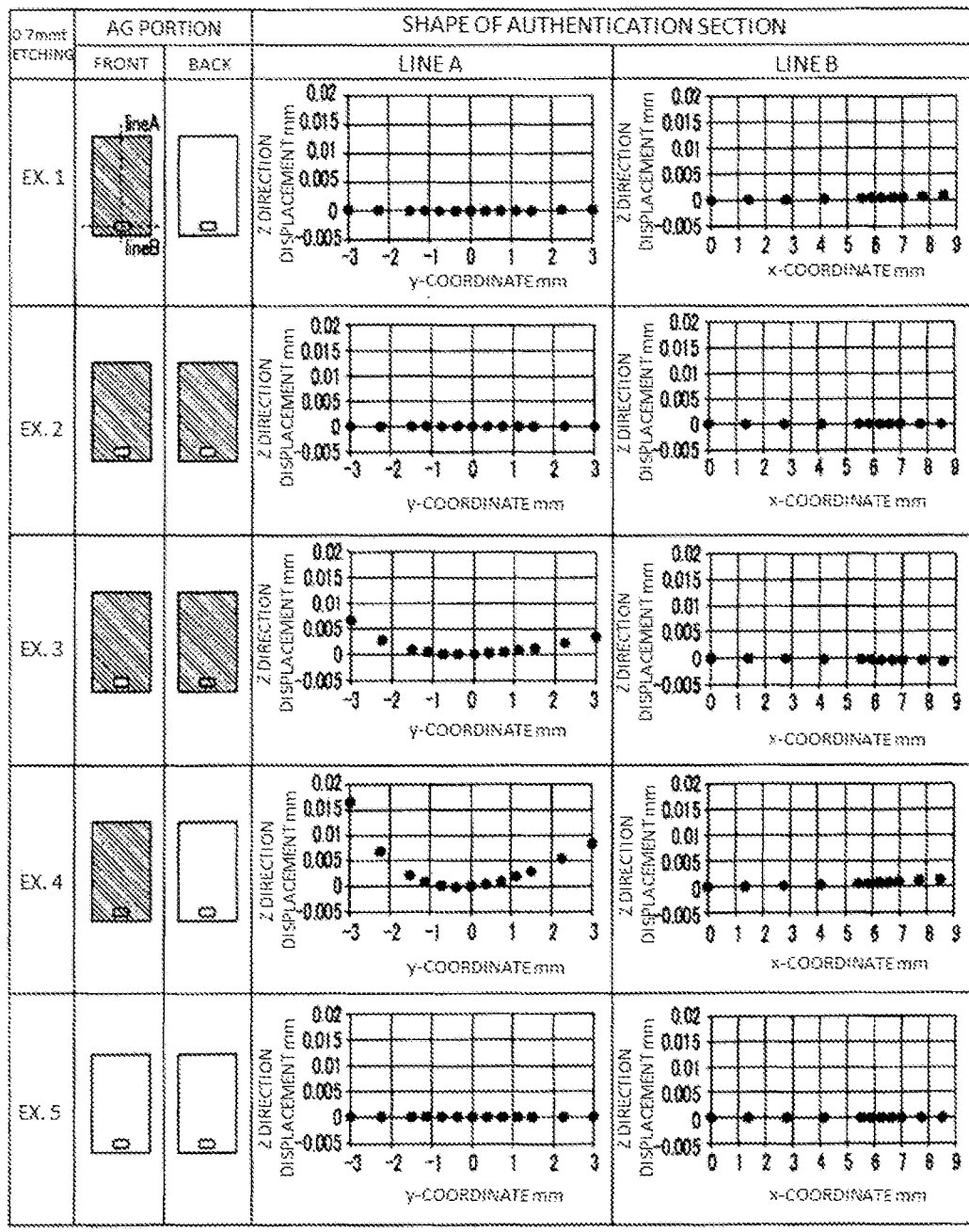
FIG. 9 is a graph illustrating the shape of the region corresponding to the authentication section in Examples.

With respect to the overall shape and the shape of region R1, as illustrated in FIG. 8, the displacement in the Z direction (see, line A of FIG. 8) on a line parallel to the longitudinal direction of the glass and parallel to the Y direction passing through the position P of the region R1 was obtained, and a difference from before chemical strengthening was determined. As illustrated in FIG. 9, the results obtained by determining only the values in the inside of the region R1 are shown together.

As for the surface compressive stress CS, in the Y direction, the surface compressive stress was determined in the same manner as the overall shape, and in the X direction, a value in the range from the position P of the region R1 to the right end was determined.

Figure 11:
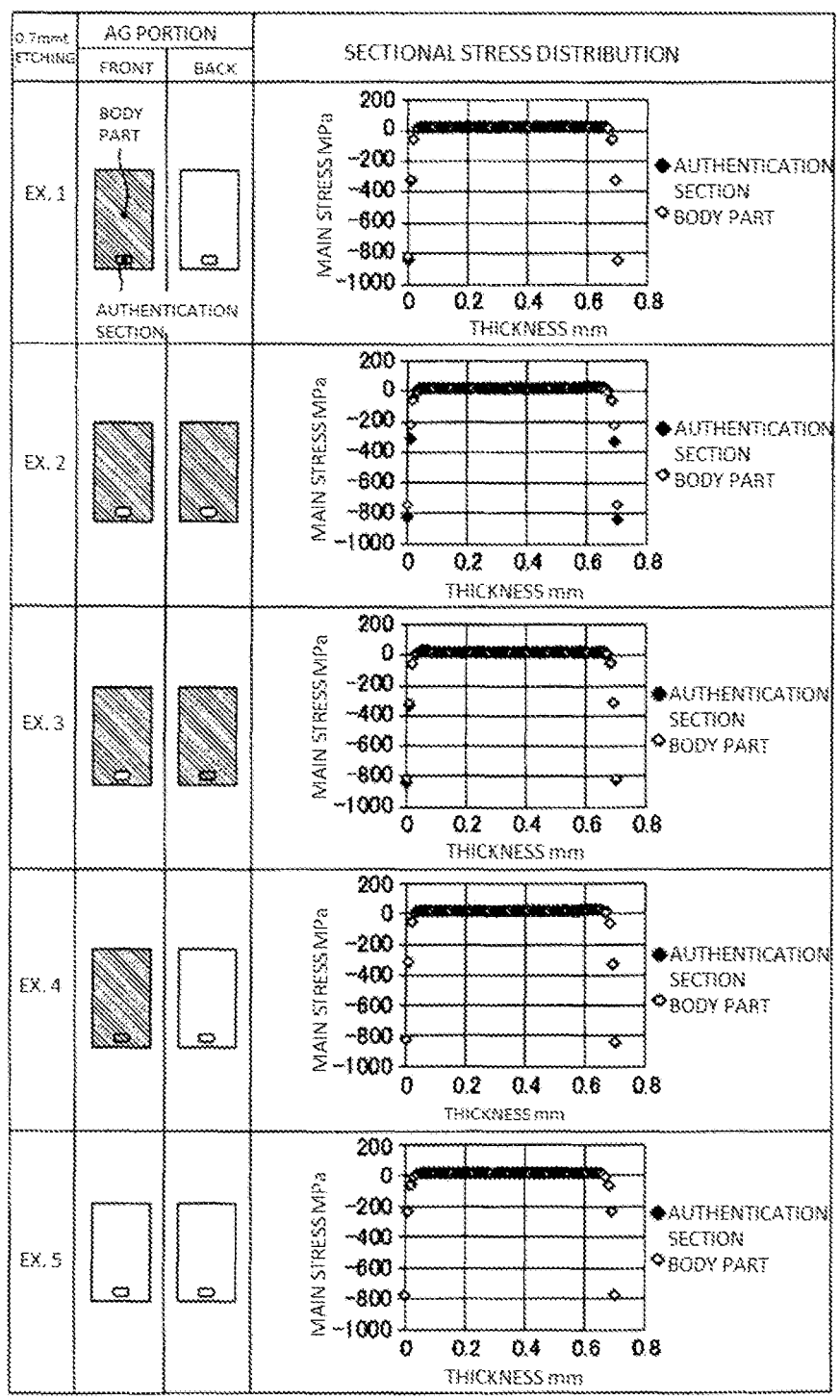
FIG. 11 is a graph illustrating the sectional stress distribution in Examples.

Measurement positions of the sectional stress and CT were the center of gravity of the glass (in FIG. 11, denoted as body part) and the center of gravity of the region R1 (in FIG. 11, denoted as authentication section). Initial values were as follows:
S=0 (MPa·mm)
CS=0 (MPa)
CTmax=0 (MPa)

The CS at a certain time ti is computed by Abaqus when in formula (2), x=0 and $t=t_1$.

$CT_{max}$ was defined as the maximum value of calculated stress values at respective nodal points in the plate thickness direction.

The sectional stress (principal stress) was defined as a larger absolute value of the stress when the maximum value and the minimum value of the principal stress at each nodal point are compared.

These results are shown in FIG. 8 to FIG.11.

FIG. 8 is a graph illustrating the displacement along line A when the position P is (x,y,z)=(0,0,0). As illustrated in FIG. 8, in Exs. 1 and 2 where the second smooth region 29 is provided in at least a part of the region facing the first smooth region 25, the displacement in the Z direction was small, compared with Exs. 3 and 4 where the second smooth region 29 is not provided in at least a part of the region facing the first smooth region 25.

FIG. 9 is a graph illustrating the displacement along line A and displacement along line B in the region R1 when the position P is (x,y,z)=(0,0,0). As illustrated in FIG. 9, in Exs. 1 and 2, almost no displacement was observed within the region R1, whereas in Exs. 3 and 4, displacement within the region R1 was observed.

It was understood from these results that when the second smooth region 29 is provided in at least a part of the region facing the first smooth region 25, among others, the first smooth region 25 and the second smooth region 29 can be prevented from warpage.

Figure 10:
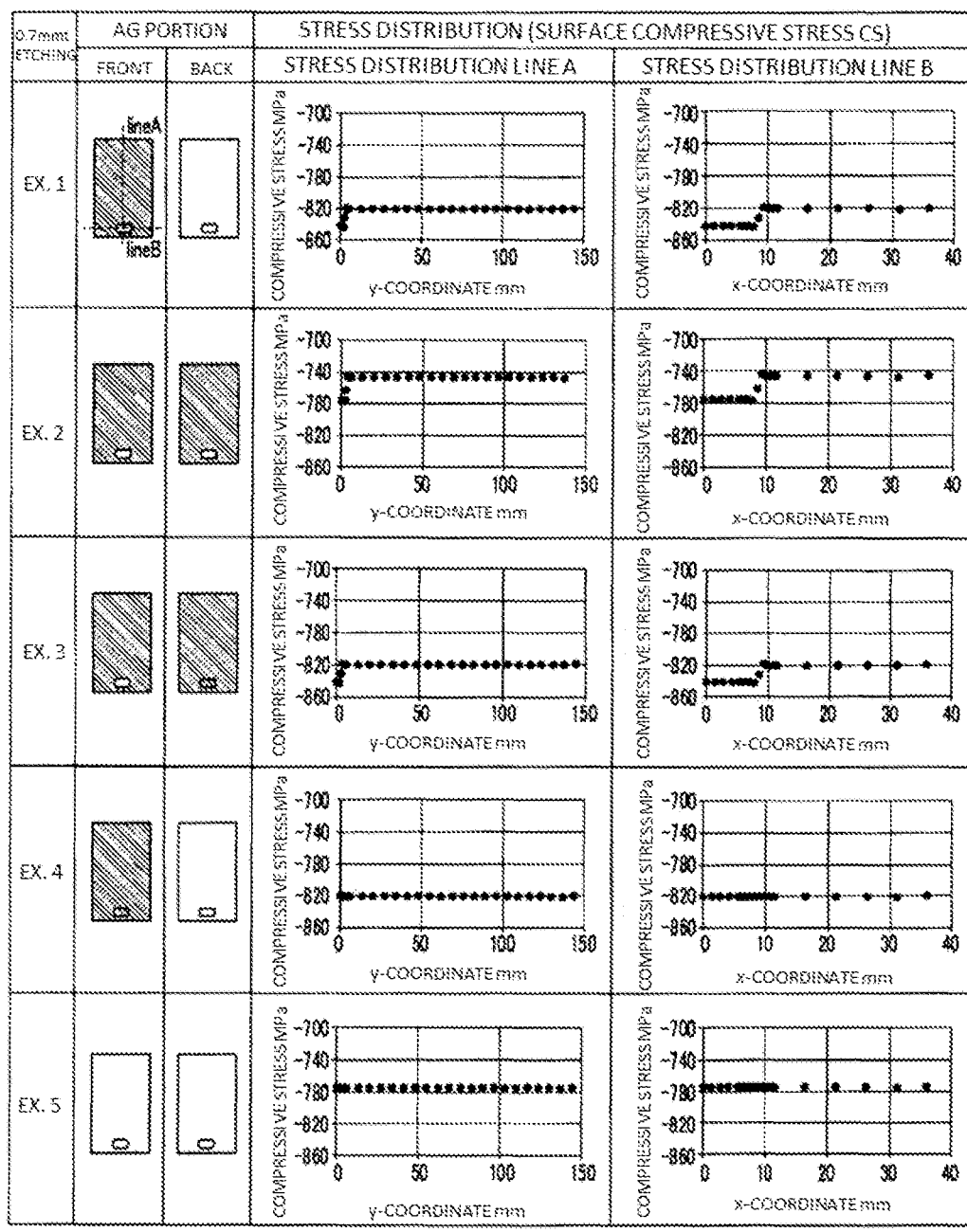
FIG. 10 is a graph illustrating the distribution of the surface compressive stress CS in Examples.

As illustrated in FIG. 10, in all, the surface compressive stress CS was 500 MPa or more in absolute value. In Exs. 1 to 3, the surface compressive stress CS of the region R1 was, in absolute value, larger than that of the region R2.

As illustrated in FIG. 11, the sectional stress distribution did not differ greatly among Exs. 1 to 5.

Accordingly, it was understood that even when the second smooth region 29 is provided in at least a part of the region facing the first smooth region 25, the sectional stress distribution can be controlled within the same range as in conventional case.

The S value was determined based on the sectional stress distribution and found to be −0.5 MPa, i.e., less than 0 MPa, in Ex. 1, and −3.4 MPa, i.e., less than −3 MPa, in Ex. 2. In addition, the value was 0.4 MPa in Ex. 3, 0.0 MPa in Ex. 4, and 0.0 MPa in Ex. 5.

It was understood from these results that even when the second smooth region 29 is provided in at least a part of the region facing the first smooth region 25, the S value can be controlled to be less than 0 MPa, furthermore, to be less than −3 MPa.

The preferred embodiments of the present invention are described in foregoing pages, but the present invention is not limited to the embodiments described above, and various modifications and substitutions can be added to the embodiments described above without departing from the scope of the present invention.

The present application is based on Japanese Patent Application No. 2018-096981 filed on May 21, 2018, the contents of which are incorporated herein by reference.

REFERENCE SIGNS LIST

1: Antiglare transparent substrate
2: Transparent substrate
21: First main surface
22: Second main surface
25: First smooth region
27: First rough region
29: Second smooth region

The invention claimed is:
1. An antiglare transparent substrate comprising a transparent substrate which comprises a chemically strengthened glass and has a first main surface and a second main surface,
wherein the first main surface comprises:
   a first smooth region having an arithmetic average roughness Ra of 0.05 nm or more and 2 nm or less; and
   a first rough region having an arithmetic average roughness Ra larger than the arithmetic average roughness Ra of the first smooth region, and
wherein the second main surface comprises, in at least a part of a region facing the first smooth region, a second smooth region having an arithmetic average roughness Ra of 0.05 nm or more and 2 nm or less, and
wherein a surface compressive stress CS of the first smooth region is larger than a surface compressive stress CS of the first rough region.

2. The antiglare transparent substrate according to claim 1, wherein the arithmetic average roughness Ra of the first rough region is more than 2 nm and 1,000 nm or less.

3. The antiglare transparent substrate according to claim 1, wherein the second main surface further comprises a second rough region having an arithmetic average roughness Ra larger than the arithmetic average roughness Ra of the second smooth region.

4. The antiglare transparent substrate according to claim 3, wherein the arithmetic average roughness Ra of the second rough region is more than 2 nm and 1,000 nm or less.

5. The antiglare transparent substrate according to claim 1, wherein, denoting Z as an atomic composition ratio X/Si of an element X selected from the group consisting of Al, B, Zr, and Ti to Si, $Z_1$ as the atomic composition ratio Z in the first rough region, and $Z_0$ as the atomic composition ratio Z in the first smooth region, a ratio $Z_1/Z_0$ of $Z_1$ to $Z_0$ is from 0 to 1.1.

6. The antiglare transparent substrate according to claim 1, wherein a skewness (Ssk) of a surface of the first rough region is 0 or more.

7. The antiglare transparent substrate according to claim 6, wherein the skewness (Ssk) of the surface of the first rough region is 0.2 or more.

8. The antiglare transparent substrate according to claim 1, wherein a skewness (Ssk) of a surface of the first rough region is less than 0.

9. The antiglare transparent substrate according to claim 8, wherein the skewness (Ssk) of the surface of the first rough region is less than −0.2.

10. The antiglare transparent substrate according to claim 1, wherein, assuming a tensile stress to be a positive value and a compressive stress to be a negative value, a plate-thickness-direction stress integrated value S of the first smooth region is less than 0 MPa.

11. The antiglare transparent substrate according to claim 10, wherein the plate-thickness-direction stress integrated value S of the first smooth region is less than −3 MPa.

12. The antiglare transparent substrate according to claim 1, wherein the surface compressive stress CS of the first rough region is 500 MPa or more.

13. The antiglare transparent substrate according to claim 1, wherein the transparent substrate has a thickness of 2 mm or less.

14. The antiglare transparent substrate according to claim 1, wherein at least a part of the first rough region has a bent portion.

15. A display device comprising the antiglare transparent substrate according to claim 1.

* * * * *